US008080358B2

(12) United States Patent
Murakami

(10) Patent No.: US 8,080,358 B2
(45) Date of Patent: Dec. 20, 2011

(54) REUSABLE ELECTROPHOTOGRAPHIC RECORDING MEDIUM AND METHOD FOR PRODUCING THE SAME, IMAGE FORMING METHOD, AND METHOD FOR REPEATEDLY USING ELECTROPHOTOGRAPHIC RECORDING MEDIUM

(75) Inventor: Kakuji Murakami, Numazu (JP)

(73) Assignee: Ricoh Company, Ltd., Tokyo (JP)

(*) Notice: Subject to any disclaimer, the term of this patent is extended or adjusted under 35 U.S.C. 154(b) by 1292 days.

(21) Appl. No.: 11/219,848

(22) Filed: Sep. 7, 2005

(65) Prior Publication Data

US 2006/0062997 A1 Mar. 23, 2006

(30) Foreign Application Priority Data

Sep. 8, 2004 (JP) ................................ 2004-260535

(51) Int. Cl.
*G03G 13/20* (2006.01)
*C08J 7/04* (2006.01)

(52) U.S. Cl. .................. 430/124.15; 430/126.2; 399/45; 399/390

(58) Field of Classification Search ........................ None
See application file for complete search history.

(56) References Cited

U.S. PATENT DOCUMENTS

| | | | | |
|---|---|---|---|---|
| 3,261,798 A * | 7/1966 | Farley | .......................... | 524/418 |
| 4,160,798 A * | 7/1979 | Price et al. | .................... | 264/213 |
| 5,607,534 A | 3/1997 | Kawanishi et al. | | |
| 5,619,765 A | 4/1997 | Tokita et al. | | |
| 5,638,842 A | 6/1997 | Tokita et al. | | |
| 5,643,380 A | 7/1997 | Saitoh et al. | | |
| 5,736,286 A | 4/1998 | Kaneko et al. | | |
| 5,769,957 A | 6/1998 | Murakami et al. | | |
| 5,782,254 A | 7/1998 | Tanikawa et al. | | |
| 5,968,301 A | 10/1999 | Murakami et al. | | |
| 2005/0141906 A1 | 6/2005 | Murakami | | |

FOREIGN PATENT DOCUMENTS

| | | |
|---|---|---|
| JP | 1-297294 | 11/1989 |
| JP | 4-64472 | 2/1992 |
| JP | 4-67043 | 3/1992 |
| JP | 4-204745 | 7/1992 |
| JP | 4-303847 | 10/1992 |
| JP | 6-75418 | 3/1994 |
| JP | 6-219068 | 8/1994 |
| JP | 8-286579 | 11/1996 |
| JP | 9-54529 | 2/1997 |
| JP | 10-74025 | 3/1998 |
| JP | 10-293510 | 11/1998 |
| JP | 10-319620 | 12/1998 |
| JP | 11-160906 | 6/1999 |

* cited by examiner

*Primary Examiner* — Monique Jackson
(74) *Attorney, Agent, or Firm* — Oblon, Spivak, McClelland, Maier & Neustadt, L.L.P.

(57) ABSTRACT

Disclosed is an electrophotographic recording medium that contains a support and an olefin-maleic anhydride copolymer, wherein the olefin-maleic anhydride copolymer exists at least near the surface of the electrophotographic recording medium on which an image is recorded, and the electrophotographic recording medium is reusable; and a method for producing an electrophotographic recording medium, an image forming method, a method for repeatedly using an electrophotographic recording medium, and a method for repeatedly using an electrophotographic recording medium.

6 Claims, 5 Drawing Sheets

REUSABLE ELECTROPHOTOGRAPHIC RECORDING MEDIUM AND METHOD FOR PRODUCING THE SAME, IMAGE FORMING METHOD, AND METHOD FOR REPEATEDLY USING ELECTROPHOTOGRAPHIC RECORDING MEDIUM

BACKGROUND OF THE INVENTION

1. Field of the Invention

The present invention relates to reusable electrophotographic recording media in which image forming materials can be removed or erased away from electrophotographic recording media, on which images being recorded, thereby the electrophotographic recording media can be regenerated and reused for recording images; methods for producing the electrophotographic recording media; image forming methods that utilize the electrophotographic recording media; and methods for repeatedly using the electrophotographic recording media by repeating the forming and erasing of images.

2. Description of the Related Art

Recently, printers, analog copiers, and digital copiers on the base of electrophotographic system have widely spread and paper has been consumed concurrently in larger quantity. Paper utilized for the recording media is usually made from pulp derived from wood, thus volume consumption of paper leads to deforestation and deterioration of terrestrial environment. Accordingly, reducing the paper consumption is one of social subjects. In addition, waste disposals are restricted from the space and cost, thus reducing the waste products is also one of social subjects.

In order to address these problems, conventionally, used or spent information-recording paper is recovered, dissociated into pulp, and reused. However, such processes necessarily consume a large quantity of energy for recovering and transporting the paper, as well as for regenerating, making, and drying to produce new paper; and the resultant paper may be insufficient in the quality such that stiffness and whiteness are lower and bleeding tends to generate at subsequent printing processes. Further, the production of image recording paper with higher quality such as sufficient whiteness from the used or spent paper may possibly invite higher cost than from usual raw material, alternatively the production of image recording paper from the used or spent paper may possibly consume a larger amount of fossil fuel e.g. petroleum than the production of conventional new paper, in some cases.

In addition, recovering and regenerating the image-recorded recording media inevitably requires to collect the paper into plants or factories through transporting the image-recorded recording media from offices and homes, which possibly invites difficult issues in terms of maintaining confidentiality and privacy protection.

Accordingly, various recording media that enable to regenerate and reuse the recording media by erasing the recorded images thereon and methods to erase image-forming materials have been proposed in order to solve the problems with respect to recovering used paper and reusing as recycled paper. For example, Japanese Patent Application Laid-Open (JP-A) No. 01-297294 discloses a method for peeling away images by heating the images on recording media, formed from at least one of plastics, metals, liquid-impermeable papers, ceramics, etc., through interposing a heat-meltable peeling material.

JP-A No. 04-64472 discloses a method for erasing electrophotographic images formed on recording media, treated with a releasant, by way of transferring and peeling away the images by use of an endless belt on which a heat-meltable resin is provided.

JP-A No. 04-67043 discloses a recording medium, wherein one surface of sheet-like recording medium in particular is subjected to release-treatment and the surface-treated recording medium is marked to distinguish from plain paper.

The recording media illustrated above are generally not feasible on various grounds since the recording medium is based on plastics, or the toner repellent agent utilizes silicone sealants or commercial adhesive tapes.

Namely, in the recording media based on plastics, operators sometimes undergo electric shock from accumulated static electricity, since the recording media are charged when images on a photoconductor are transferred on the recording media under an electrophotographic process and the charged electricity hardly dissipates from the recording media even after the transfer is completed. Further, plastics are typically more expensive than paper. Moreover, recording media based on plastics cannot be easily reused unlike unnecessary paper, thus tend to put burden on environment.

On the other hand, toner repellent agents such as silicone compounds are disclosed in the prior art indicated above for making easy the image erasion. Further, JP-A No. 10-319620 discloses a reusable recording medium on which a silicone compound is applied, wherein a coated layer is applied in a coated amount of 2 $g/m^2$ to 15 $g/m^2$ on a recording surface of a support, the coated layer contains a filler and a resin, a releasant obtained from a composition that contains a modified silicone oil having a group reactive with silane compounds in the molecule is coated or impregnated on the coated layer and is dried, thereby the reusable recording medium is prepared.

It has been confirmed that application of silicone compounds on recording media may make possible to erase images on recording media by way of heating, pressuring-transferring, or rubbing without coating a releasant on the recording media.

However, the silicone compounds are relatively expensive, therefore the recording media are unfortunately expensive that utilize a silicone compound for the toner repellant. Further, the application of silicone compounds tends to lower excessively the fixing ability of images, which often causes such problems that image quality is poor due to offsets at image forming, alternatively image forming materials are fallen off when handling the recording media on which images being recorded, which makes the images illegible and/or the image forming materials smear the surroundings. In addition, writing implements such as water-based pens and oil-based pens are hardly allowable to write images on the recording media on which silicone compounds are coated.

Such toner repellency of silicone compounds cannot typically be reduced, for example, by being blended a resin with less or no toner repellency since the silicone compounds typically exhibit considerably low compatibility with other compounds, thus appropriate resins cannot be selected.

One of the specific reasons is that when a silicone compound and a resin other than silicone compounds are blended and coated to prepare recording media, the resultant recording media typically exhibit different effects on adhesion reduction of image forming materials, thus recording media with stable adhesive ability are hardly obtainable.

Further, silicone compounds typically have less or no aqueous solubility, thus it is difficult to coat using aqueous solvents. Currently, solvent-less silicone resins are commercially available that are curable by action of a catalyst. However, such resins typically involve difficulties in the production process that special coating apparatuses, e.g. gravure coaters, are necessary for coating and also pot life of the coating liquid is excessively short.

In order solve these problems, JP-A No. 06-219068 proposes a reusable recording medium, in which polyacrylates or polymethacrylates that contain a fluorinated alkyl group are employed as a toner repellent agent. However, fluorinated compounds are typically expensive, thus the recording medium is also expensive. In addition, since the toner repellency of fluorinated compounds is considerably intensive in general, the fixing ability between image forming materials and recording media can be hardly controlled. For example, when a fluorinated compound is employed that contains fluorine element within the molecule in a content to exhibit some toner repellency, the fixing ability of image forming materials may be excessively lowered, alternatively recording on image recording media is likely to be difficult by means of writing implements such as water-based pens and oil-based pens, thus the fixing ability of the image forming materials is hardly assured. Moreover, the fluorine compound disclosed in the literature are insoluble or less-soluble not only in water but also in conventional organic solvents, and a solvent containing halogen element are necessary for the coating process, thus environmental issues may be induced.

JP-A No. 08-286579 discloses a recording medium of which the contact angle with a liquid, having substantially the same surface tension with toners, is controlled into a certain range by use of a compound with an alkyl group such as alkylketene dimer on the surface of the recording medium. In the Examples of the literature, synthetic sizing agents of wax-like compounds such as alkylketene dimer are employed. It has been confirmed that the toner repellency of the surface of recording media can be controlled properly by using the alkylketene dimer and adjusting the content and/or mixing ratio with other materials.

However, alkylketene dimers for sizing agents are typically a single-molecular compound having a melting point of 40° C. to 70° C., thus tend to migrate into peeling members, image forming materials, and recording media, therefore, such problems are inevitable that the content or ratio of the alkylketene dimer at the surface region of the recording media tend to fluctuate and the reliability is insufficient under repeated usages.

Further, there exists a lack that small variation of conditions during the production tends to lead to the variation of the toner repellency. In the literature, sizing agents of styrene, olefin, and acrylic compounds are described to be usable in addition to the alkylketene dimers; however, no descriptions appear with respect to the specific constitutions or superior effects over the alkylketene dimers of the compounds.

JP-A No. 10-074025 discloses a recording medium that is added a toner repellent agent of a surfactant that comprises a fluorine-containing compound, silicone compound, and alkyl group-containing surfactant. However, the surfactant that comprises the fluorine-containing compound and/or silicone compound suffer from the same problems described above. Further, when the toner repellent agent of the surfactant that comprises the alkyl group-containing surfactant is utilized, there exist problems as described above that the content or ratio of the alkylketene dimer at the surface region of the recording media tend to migrate into peeling members, image forming materials, and recording media, similarly to the alkylketene dimer, and the reliability is insufficient under the repeated usages.

SUMMARY OF THE INVENTION

The objects of the present invention are, in the first aspect, to provide electrophotographic recording media, in which the recording media can be utilized to form images by conventional electrophotographic systems, the image fixing property is within practical range, image falling and/or smear are not likely to occur due to offset, images are high quality, image forming materials can be easily removed from the recording media on which images are formed, image quality and image erasing property undergo less change under repeated usages, and the cost is lower; and also to provide methods for producing the electrophotographic recording media, image forming methods by use of the recording media, and method for repeatedly using the recording media.

The objects of the present invention are, in the second aspect, to provide reusable electrophotographic recording media and methods for producing the same, in which the recording media can be coated by use of an aqueous solvent and a conventional coating device without employing such solvents as organic solvents and fluorocarbons, the recording media can be produced by way of safety processes with less environmental problems, and the surface layer of the recording media is water resistant after the coating liquid is dried.

The objects of the present invention are, in the third aspect, to provide reusable electrophotographic recording media, methods for producing the same, image forming methods by use of the recording media, and method for repeatedly using the recording media, in which image forming materials can be removed without applying image erasing promoters that contain organic solvents and/or surfactants by use of a simple image erasing unit, thus images can be erased with less environmental problems and lower running cost.

The electrophotographic recording media of the present invention comprises a support and an olefin-maleic anhydride copolymer on the support, wherein the olefin-maleic anhydride copolymer exists at least near the surface of the electrophotographic recording medium on which an image is recorded, and the electrophotographic recording medium is reusable; therefore, the olefin portion of the copolymer offer toner-repellency and the maleic anhydride portion of the copolymer offer moderate affinity with toners, thereby such excellent effects may be afforded that the adhesive strength between the recording media and image forming materials may be adjusted into an appropriate range, thus the fixing property and the image erasing property are properly balanced. The existence of the olefin-maleic anhydride copolymer in the electrophotographic recording media can be easily recognized by conventional analytical methods. The olefin-maleic anhydride copolymer can be included into the electrophotographic recording media typically by coating or impregnating the liquid that contains the copolymer. In such methods, the olefin-maleic anhydride copolymer does not necessarily form a continuous layer on the support. For example, the olefin-maleic anhydride copolymer may not be coated into a layer at the sites where cellulose fibers of supports are exposed or a sizing agent is blocked or at convex portions of supports having an irregular surface. Further, the pore portions, where the olefin-maleic anhydride copolymer cannot be coated into a continuous layer, may represent an effect of repellent material for image forming materials e.g. toners in particular. In addition to the configuration of supports, portions of repellent or affinitive for image forming materials derived from uneven quality of materials may refuse the olefin-maleic anhydride copolymer to be coated into a layer.

In the present invention, since the compound for toner repellency is a polymer, the compound may be free from migration or movement into peeling members, image forming materials, or recording media under repeated forming and erasing of images, thus resulting in higher reliability under repeated usages.

When information to notice reusable is marked to the electrophotographic recording media of the present invention, the printing is effectively controlled to be permitted under an erasable mode only when reusable recording media can be supplied to an image forming unit; since it is possible to detect whether or not the reusable recording media are installed within a paper-feed portion such as a paper-feed cassette of image forming apparatuses.

When the olefin portion of the olefin-maleic anhydride copolymer is derived from an olefin monomer of which the carbon number is 10 to 20, in the recording media of the present invention, the recording media applied with the olefin-maleic anhydride copolymer may effectively exhibit well-balanced fixing property and image erasing property; since the adhesive strength between the olefin-maleic anhydride copolymer and image forming materials may be sufficient.

In addition, the content of the olefin-maleic anhydride copolymer may be raised in the composition near the surface of recording media, thus such excellent effects may be derived that image fixing property and erasing property of image forming materials are attained stably, and fluctuation of fixing property and image erasing property due to production conditions may be decreased.

When the olefin portion of the olefin-maleic anhydride copolymer is derived from an olefin monomer having a double bond at the α-site, higher reliability may be effectively attained even under repeated usages; since the copolymer may be produced easily and stably, thus the copolymer employed as a toner-repellent compound in the reusable recording media may be free from migration or movement into peeling members, image forming materials, or recording media under repeated usages of the recording media.

When the olefin-maleic anhydride copolymer comprises at least a monomer unit of olefin and at least a monomer unit of maleic anhydride in a mole ratio of 1.3/1 to 1/1.3, polymers may effectively provide a moderate adhesive strength between recording media and image forming materials so as to balance the fixing property and image erasing property; since the monomer units of olefin and maleic anhydride are likely to be arranged in a regular manner in the copolymers.

In addition, highly reliable reusable recording media may be obtained in which the fixing property and image erasing property are not significantly affected by variations of synthesis conditions of resins and coating conditions of recording media.

Preferably, the content of the olefin-maleic anhydride copolymer near the surface of the electrophotographic recording medium is 20% by mass to 100% by mass. By virtue of employing the olefin-maleic anhydride copolymer as a toner repellent agent, proper fixing property and image erasing property may be obtained even in such a higher content of the toner repellent agent. Consequently, such a higher content of the toner repellent agent may avoid significant variations of fixing property and image erasing property due to variations of delicate coating conditions or contents in compositions, thus highly reliable reusable recording media may be obtained.

Preferably, the electrophotographic recording media of the present invention comprise one of starches, starch derivatives, and acrylic resins in addition to the olefin-maleic anhydride copolymer at least near the surface of the electrophotographic recording medium, on which the image is recorded, in a content of 20% by mass to 80% by mass. The starches, starch derivatives, and acrylic resins may be far from significant inhibition for the toner repellency of the olefin-maleic anhydride copolymer; also the content range of 20% by mass to 80% by mass may suitably suppress the toner repellency when solely employed olefin-maleic anhydride copolymer provides excessive toner repellency and desirable fixing property may not be obtainable; further, the crawling of coating liquids may be effectively prevented that often generates when olefin-maleic anhydride copolymers are solely applied to the recording media.

Preferably, the electrophotographic recording medium further comprises an organic pigment at least near the surface of the electrophotographic recording medium on which the image is recorded, in addition to the olefin-maleic anhydride copolymer. The additional pigment may provide such effects that insufficient opacity of recording media, inferior transportability due to lower friction coefficient, and poor writing property, which often generate when only the olefin-maleic anhydride copolymer or only the olefin-maleic anhydride copolymer as well as resins with no toner repellency are employed, may be prevented by the pigment; and also organic pigments can effectively prevent coagulation of coating liquids, thereby recording media can be produced stably.

Preferably, the electrophotographic media of the present invention contain the olefin-maleic anhydride copolymer, within a composition near the surface, which is saponified into an ammonium salt, is dissolved into an aqueous composition, is coated on the support, and is subjected to ammonia separation induced under a drying condition. The olefin-maleic anhydride copolymer enables to erase images formed on the recording media, and may provide such effects that the olefin-maleic anhydride copolymer is far from flowing out, sticking to the other recording media due to the stickiness, or losing the image erasing property, even when the recording media are wetted by water e.g. rain.

When the support is a paper formed mainly from cellulose fibers, and a composition containing the olefin-maleic anhydride copolymer is deposited at least on the side of the support to which the image is recorded, the fixing property may effectively be free from degradation even when the composition is coated in an amount to smooth the paper so as to enable the image erasing, since the olefin-maleic anhydride copolymer may afford an adhesiveness suitable to both of fixing and erasing of image forming materials.

Accordingly, even when the composition containing the olefin-maleic anhydride copolymer is directly coated on the paper without the filling layer, reusable recording media may be obtained with excellent fixing property and erasing property of images.

Further, the support of paper may be provided by way of dissociating waste recording media into cellulose fibers and reusing the cellulose fibers, thus the recording media may be reusable with less environmental load.

Further, the support of paper typically has no capability to reserve electric charge for longer period contrary to the support of resin film, therefore, operators may take no risk of electric shock, and troublesome overlapped feed of recording media may be avoided in image forming apparatuses or image erasing apparatuses.

When the support is a paper formed mainly from cellulose fibers, and the deposited amount of the composition containing the olefin-maleic anhydride copolymer is 1 $g/m^2$ to 15 $g/m^2$ on the base of total mass on both sides after drying, the fixing property of image is effectively attained while erasing property of images is improved; since the composition containing the olefin-maleic anhydride copolymer may be coated substantially uniformly over the entire surface where the paper contact with image forming materials, and also larger concave portions near the surface of paper may be covered with the composition containing the olefin-maleic anhydride copolymer.

Further, the durability under repeated usages may be effectively improved, since cellulose fibers at the surface of recording media may be free from peeling upon image erasing under repeated forming and erasing of images.

When the support is a paper formed mainly from cellulose fibers, a filling layer containing a pigment and a polymer is coated on the support, and a composition containing the olefin-maleic anhydride copolymer is deposited on the filling layer, repeatability may be effectively enhanced; since the surface of recording media to which image forming materials contact can be coated with the composition containing the olefin-maleic anhydride copolymer even the composition containing the olefin-maleic anhydride copolymer is coated in less amount, and the coated film may be far from cracking even the content of the olefin-maleic anhydride copolymer is higher in the composition, thus no image forming materials are likely to residue within cracks under repeated image forming and erasing.

Further, show-through may be effectively prevented since the filling layer maintains the opacity even when the content of the olefin-maleic anhydride copolymer is higher in the coated film.

When the deposited amount of the composition containing the olefin-maleic anhydride copolymer is 1 $g/m^2$ to 15 $g/m^2$ on the base of total mass on both sides after drying, the surface of the recording media to which image forming materials contact may be effectively coated with the composition containing the olefin-maleic anhydride copolymer even in less coated amount of the composition containing the olefin-maleic anhydride copolymer, since the filling layer eliminates or lessens concave portions of the paper.

Further, less coated amount of the composition containing the olefin-maleic anhydride copolymer may prevent cracks within the coated film, thus no image forming materials are likely to residue within cracks under repeated image forming and erasing, resulting in improvement of repeatability. Further, cellulose fibers are far from peeling from the surface of recording media upon erasing images, thus image erasing property may be effectively prevented from the degradation, and the repeatability and durability may be sufficient.

When the pigment is selected from the group consisting of calcium carbonate, kaolin, talc, clay, titanium oxide, and zinc oxide, and the polymer is selected from the group consisting of polyvinyl alcohols, starches, carboxymethylcelluloses, polyvinylacetate emulsions, acrylic resin emulsions, natural rubber latexes, and synthetic rubber latexes, the coated layer may exhibit adhesiveness to both of the base paper and the composition containing the olefin-maleic anhydride copolymer. Therefore, the recording media may be effectively prevented from peeling at the interface with the filling layer or at inside the peeling layer under repeated forming and erasing of images.

Further, white pigments included into the filling layer may effectively prevent show-through owing to enhancing the opacity of recording media.

Incidentally, the deposited amount of 1 $g/m^2$ to 15 $g/m^2$ on the base of total mass on both sides corresponds to a thickness of 0.5 μm to 7.5 μm, provided that the composition containing the olefin-maleic anhydride copolymer has a specific gravity of 1.0 and is coated on both sides uniformly. Practically, the toner repellency is often affected by the deposited amount rather than the film or layer thickness. Although various thickness meters may be available with respect to thicker films, the recording media may not be properly measured by the thickness meters, since the surface roughness of paper is usually as much as about 2 μm even when the filling layer is provided. Practically, the film thickness may be determined directly by way of cutting the paper and observing the cross-section by an electron microscope. Conveniently, the average film thickness may be calculated from the deposited amount and the specific gravity of the composition.

In another aspect of the present invention, a method for producing an electrophotographic recording medium is provided that comprises saponifying an olefin-maleic anhydride copolymer in a basic aqueous solution to prepare a saponified product, preparing a composition that dissolves the saponified product in an aqueous medium, and coating the composition on a support.

Since the composition that dissolves the saponified product in an aqueous medium is coated on the support, such effects may be derived that possibility of fire is little at the coating process, explosion proof is unnecessary for production facilities, and conventional coating apparatuses are applicable.

In the method for producing an electrophotographic recording medium, preferably, the following steps are performed: saponifying the olefin-maleic anhydride copolymer by reaction with ammonium hydroxide to prepare a water-soluble saponified product, preparing a composition that dissolves the saponified product in an aqueous medium, coating the composition on a support, and drying the coated composition to separate ammonia from the coated composition, thereby making the water-soluble saponified product into poorly soluble or non-soluble in water.

Accordingly, the coating may be carried out by use of a liquid medium based on water, and the resultant coated material of recording media may be sufficiently water-proof. Further, the olefin-maleic anhydride copolymer may be effectively far from flowing out even when the recording media are wetted by water e.g. rain, sticking to the other recording media due to the stickiness, or losing the image erasing property.

In another aspect of the present invention, an image forming method is provided that comprises depositing an image forming material of thermoplastic powder on the reusable electrophotographic recording medium in accordance with an image pattern, contacting and pressing the image forming material with a heating member of 100° C. or higher, and fixing the image forming material onto the electrophotographic recording medium.

Accordingly, the fixing property of images may be feasible for the recording media, and forming and erasing of images may be effectively carried out through transferring under heating and pressing in a dry condition, and rubbing in a dry condition.

In the image forming method, when the image forming material, which contains a thermoplastic powder, contains one of thermoplastic polyester resins and styrene-acrylic resins, the fixing property and the erasing property of images undergo less variation under repeated forming and erasing of images; since physical properties such as viscoelasticity and softening temperature may be appropriate for forming and erasing of images, and proper adhesive strength may be afforded for the recording media of the present invention, thus proper fixing property and the erasing property of images may be attained.

In another aspect of the present invention, the reuse of recording media may be practically carried out with less environmental load owing to employing the reusable recording media of the present invention; and image forming materials on recording media may be removed by use of a simple unit for erasing image forming materials, since images may be erased by way of heating and transferring under a dry condition in terms of conventional electrophotographic image forming materials having a plasticity.

In addition, the reusable electrophotographic recording media of the present invention may make possible to remove the image forming materials on recording media without employing an image erasing promoter, therefore, jams or wrinkles of recording media may be effectively excluded from image forming processes.

When the method for repeatedly using an electrophotographic recording medium of the present invention comprises depositing an image forming material on the electrophotographic recording medium in accordance with an image pattern, contacting and pressing the image forming material with a heating member of 100° C. or higher, and fixing the image forming material to form an image on the electrophotographic recording medium, or when the image forming material comprises one of polyester resins and styrene-acrylic resins, since the image fixing property on recording media may be feasibly carried out on recording media and image forming materials on recording media may be removed with a simple unit for erasing image forming materials, the recording media may be effectively reused in a practical manner and with less environmental load.

In the method for repeatedly using an electrophotographic recording medium, the reuse of recording media may be practically carried out with less environmental load owing to employing the reusable recording media of the present invention; and image forming materials on recording media may be removed by use of a simple unit for erasing image forming materials since images may be erased by way of rubbing under a dry condition in terms of conventional electrophotographic image forming materials having a plasticity.

In addition, the reusable electrophotographic recording media of the present invention may make possible to remove the image forming materials on recording media without employing a liquid for promoting image erasing, therefore, jams or wrinkles of recording media may be effectively excluded from image forming processes.

Figure 1A:
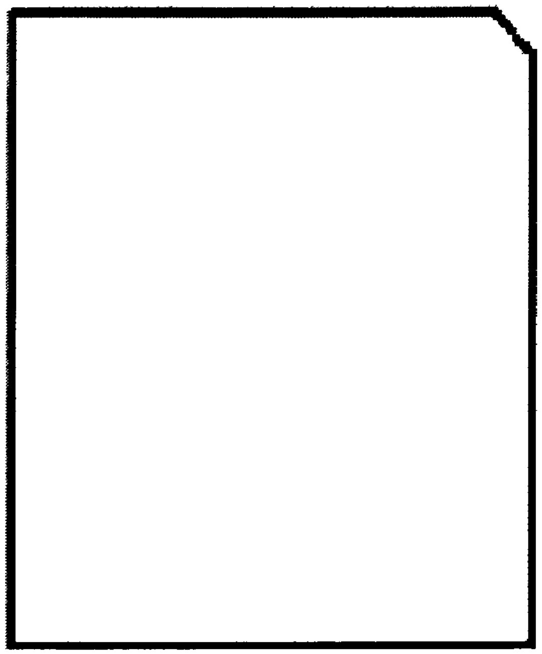
FIG. 1A is an exemplary view of identification information showing that the electrophotographic recording medium of the present invention is reusable.

DESCRIPTION OF THE PREFERRED EMBODIMENTS (Electrophotographic Recording Medium)

The electrophotographic recording medium of the present invention is reusable, and comprises a support, a layer containing an olefin-maleic anhydride copolymer on the support, and the other optional layers depending on requirements, wherein the layer containing the olefin-maleic anhydride copolymer exists at least on the side of the electrophotographic recording medium on which an image is recorded, and the electrophotographic recording medium is reusable.

—Support—

The support is exemplified by paper based on cellulose fibers, art paper on which a coated layer is provided, synthetic paper formed of a plastic film having an expanded structure, and films formed of thermoplastic resins such as polyethylene terephthalate (PET), polypropylene (PP), and acetate.

In the case that paper is employed as the support, the raw material of the support may be wood-based materials such as chemical pulp and mechanical pulp, non-wood cellulose fiber such as baggasse and kenaf, pulp regenerated from used paper through removing inks, pulp from dissociated loss paper, or the like.

The support may be selected from commercially available thermoplastic films of PET, PP, acetate film, synthetic paper, etc. Preferably, the support is formed of paper from the viewpoint that the production cost is relatively low, no electric charge tends to remain for long period even when the recording medium is charged within electrophotographic apparatuses, operators are practically free from electrical shock, and paper is reusable by dissociating into cellulose fibers when repeated use comes to difficult and/or the reuse comes to impossible.

The electrophotographic recording media comprise the support described above, and contain an olefin-maleic anhydride copolymer at the site near the surface on which images are recorded. The fixing property of image forming materials onto the recording media and the image erasing property from the recording media significantly depend on the surface properties of the recording media where the image forming materials contact, in particular on the wetting properties with the image forming materials. Also the erasing property of images is mainly affected by the surface property of the recording media where the image forming materials contact. As such, the surface of the recording media tends to influence exclusively on the properties, therefore, a composition is to be provided in a configuration of a layer having a substantial thickness in dried condition. The thickness of the layer composition cannot be determined strictly and depends on various factors such as conditions of support e.g. porosity, affinity with the solvent or dispersant utilized for coating, solid content or solvent ratio in the solvent or dispersant, permeability of the coating liquid into the support, viscosity of the coating liquid, and drying period after the coating. The term "near the surface" in the present invention usually means the area of about 0.005 μm to 5 μm thick from the outermost surface including the outermost surface.

Whether the support is porous paper formed of cellulose fibers or the support is a plastic film, the support may practically take a fixing ability and an erasing ability of images, by virtue of depositing the olefin-maleic anhydride copolymer near the surface of the support. The mechanism why the olefin-maleic anhydride copolymer can bring about the proper fixing-erasing ability of images is not necessarily clear, but it is believed that the olefin part of the olefin-maleic anhydride copolymer provides the recording media with toner repellency, thus enabling the erasing of images, and the maleic anhydride part provides the copolymer with water-solubility, thus enabling the coating with aqueous solvent, and also moderating the toner repellency at the olefin part, thus increasing appropriately the adhesive property with the image forming materials.

—Olefin-Maleic Anhydride Copolymer—

The term "olefin" in the present invention indicates hydrocarbons that have a double bond and are polymerizable through an addition polymerization. For example, the olefin may be a compound having a double bond at α-site of the chain end and an alkyl group $R_1$ as shown by the following formula.

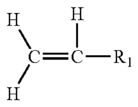

More specifically, the olefin is a compound having $R_1$ of a linear chain as shown by the following formula.

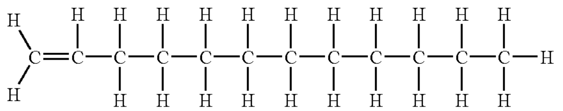

Further, the olefin may be a compound having a double bond at α-site of the chain end and a branched alkyl group as shown by the following formula, in which $R_2$, $R_3$, $R_4$ are each a linear alkyl group.

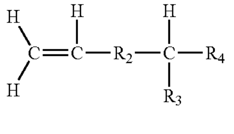

Further, the olefin may be a compound having a double bond at a site other than α-site as shown by the following formula, in which $R_5$ and $R_6$ are each a linear alkyl group having one or more carbon atom.

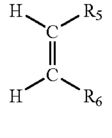

More specifically, the compound expressed by the following formula is exemplified.

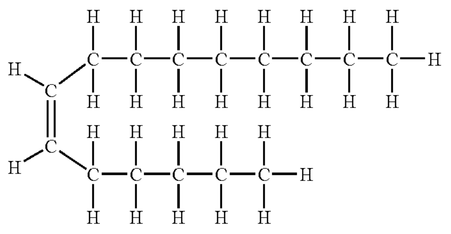

The olefin monomer in the olefin-maleic anhydride copolymer may be a compound of any types illustrated above. Numerous specific compounds can be exemplified; specific compounds are omitted herein, since those will be clear for persons skilled in the art. Instead, only the number of carbon atoms in the alkyl group areas will be explained below.

Preferably, the number of carbon atoms is 10 to 20 at the olefin part. When the number of carbon atoms is less than 10, the toner repellency is likely to be undesirable, and the intended erasing property of images hardly generates. Specifically, when the number of carbon atoms is less than 10, the erasing of images of the recording medium is likely to be difficult unless a liquid containing an organic solvent or surfactant is added to the recording medium.

When the number of carbon atoms is more than 20, the toner repellency is remarkable, the polymer containing the olefin part at the site near the surface of the recording medium should be diluted with another resin prior to the usage in order to assure the fixing property of images. When the polymer of the olefin monomer having a carbon number of more than 20 and maleic anhydride is applied to the recording media, the fixing ability of the image forming materials tends to be insufficient, unless the olefin-maleic anhydride copolymer is diluted to a lower level. On the other hand, when the ratio of the polymer containing the olefin is lower near the surface of the recording media, slight variation of conditions for producing the recording media tends to cause significant fluctuations in fixing and erasing abilities of the resultant recording media, thus stable properties are hardly obtainable.

As such, olefin monomers having a carbon number of 10 to 20 are preferable in the present invention since recording media may be obtained with stable fixing and erasing abilities, although copolymers from olefin monomers having a carbon number of more than 20 are also possible to be utilized for preparing the recording media.

In general, the olefin compounds of high-volume product are hardly obtainable as a single compound, and are typically obtainable as a mixture of different carbon numbers. When olefin compounds having a carbon number of no more than 9 are included in the mixture, such compounds seldom affect the fixing and erasing abilities, since the fixing and erasing abilities of recording media that include the olefin-maleic anhydride copolymer tend to be more affected by olefin compounds having a larger carbon number.

The olefin compounds utilized in the present invention are not necessarily required to contain a double bond at α-site. When the double bond exists at other than the α-site, the polymerization reaction hardly progresses, and the reaction to yield a dimer between maleic anhydride and the olefin tends to progress exclusively without yielding a copolymer. Accordingly, it is preferable in the present invention that the copolymer is of the monomer having mainly a double bond at α-site and maleic anhydride.

By use of the olefin-maleic anhydride copolymer as a toner repellent agent of the recording media, the repeatability of forming-erasing images may be improved owing to that the toner repellent agent hardly migrates into peeling members, image forming materials, and recording media, which is likely to occur when monomolecular or lower-molecular mass surfactants or waxes are employed as a toner repellent agent.

Another monomer component of the olefin-maleic anhydride copolymer adapted to the present invention is maleic anhydride. The maleic anhydride is expressed by the following formula.

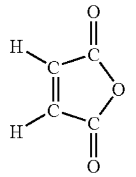

In the polymerization reaction of the maleic anhydride with the olefin compound, anhydrides soluble into organic solvents or olefins may progress the polymerization reaction. In the polymerization reaction, the mole ration of the olefin monomer and the maleic anhydride is preferably about 1/1, more specifically about 1.3/1 to 1/1.3. The polymer of the mole ratio of about 1/1 may lead to proper fixing ability and stable erasing ability of images.

The reason is not necessarily clear, but it is believed that the polymerization reaction under the mole ratio of about 1/1 may easily yield a polymer that contains an olefin monomer and maleic anhydride alternatively bonded each other in a relatively regular manner. Further, it is considered that the regularly bonded olefin part that impart the toner repellency and the maleic part that impart hydrophilic property and allow water-solubility may stabilize adhesive property between the image forming materials and the recording media that utilizes the polymer.

When the polymer, synthesized from the olefin monomer and maleic anhydride in a ratio of about 1/1, is applied to near the surface of the recoding media, proper fixing ability and stable erasing ability of images may be attained in terms of image forming materials conventionally utilized for electrophotographic apparatuses. In particular, polymers obtained from olefin monomers having a carbon number of 10 to 20 and a double bond at the α-site may result in well-balanced fixing ability and erasing ability of images.

Accordingly, even only the olefin-maleic anhydride copolymer is employed into recording media in a condition that the content of the polymer is 100% within the composition near the surface of the recording media, proper fixing and erasing abilities of images may be stably attained.

Silicone resins or fluorinated resins have been utilized for a toner repellent agent within conventional reusable recording media. These resin components typically exhibit remarkable toner-repellency and thus proper erasing ability of images can be attained; however, a number of practical problems have been remained; namely, the fixing ability is remarkably low, thus offset occurs at fixing devices during image forming processes, or images often fall off due to rubbing actions while handling recording media on which images are recorded.

Further, even if silicone resins or fluorinated resins are utilized after being diluted by a resin with no toner repellency, the fixing ability cannot be assured unless the content of the silicone resins or fluorinated resins is reduced within the composition near the surface of recording media. When the content is reduced, slight variation of conditions for producing the recording media tends to cause fluctuations in fixing-erasing abilities of the resultant recording media, thus stable properties are hardly obtainable.

Certain surfactants or waxes can exhibit toner repellency and may be utilized for reusable recording media. For example, when an olefin compound having a double bond at other than the α-site and maleic anhydride are induced to react, a dimer of the olefin and maleic anhydride is synthesized. The surfactants obtained by way of saponification of the dimer compounds typically exhibit remarkable toner repellency. The surfactants from dimers that are obtained from olefins having a carbon number of 16 to 22 and maleic anhydride may yield a well-balanced condition of fixing and erasing properties of image forming materials by way of compounding the surfactant into non-toner repellent matrix of polyvinyl alcohol or starch in a content of 1% by mass or less.

However, the surfactants typically exhibit themselves excessive toner repellency, thus the compounded ratio of the surfactants is required to be considerably reduced, thus stable fixing property and erasing property of images are hardly obtainable.

On the contrary, the olefin-maleic anhydride copolymers may inherently provide well-balanced fixing property and erasing property of images as described above, therefore, may be compounded in a larger content within the composition near the surface of the recording media. More specifically, well-balanced fixing property and erasing property of images may be attained in a content of 20% by mass to 100% by mass in terms of the olefin-maleic anhydride copolymer.

The reason why the proper fixing ability may be attained even the olefin-maleic anhydride copolymers of a toner-repellent agent is compounded in a higher content within the composition near the surface of the recording media is believed, as described above, that the maleic portion of the polymer act to reduce the toner repellency of the olefin portion, and contribute to moderate the adhesive ability with image forming materials. The olefin-maleic anhydride copolymers employed in the present invention are those obtained by polymerization reaction between an olefin monomer and maleic anhydride monomer. Preferably, the olefin-maleic anhydride copolymers, obtained by the polymerization reaction, are hydrated and saponified in an alkaline aqueous solution thereby to form a water-soluble copolymer.

The olefin-maleic anhydride copolymer, hydrated and saponified in an alkaline aqueous solution, is considered to have the following formula.

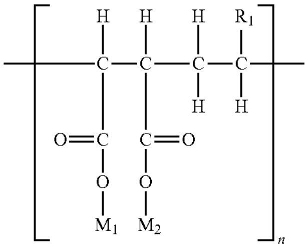

wherein $M_1$ and $M_2$ are each an alkaline component such as sodium, potassium, lithium, ammonium, quaternary ammonium, and phosphonium; $R_1$ represents an alkyl group, which may be linear or branched and preferably the carbon number is 8 to 18; "n" is preferably an integer of 15 to 1000.

When the olefin-maleic anhydride copolymer is coated in a form of an ammonium salt on the support, then heated and dried, the polymer turns into a resin poorly-soluble or non-soluble in water, through dissociation of ammonium from the copolymer. Namely, a waterproof resin layer, which is water soluble at coating, may be prepared on the electrophotographic recording media.

When the olefin-maleic anhydride copolymer is hydrated and saponified in an alkaline aqueous solution thereby is made water-soluble, then is coated on recording medium using a water-based solvent, the coating liquid may exhibit higher stability at coating process, explosion-proof equipments are not required for production apparatuses, and conventional coating devices may be available for coating procedure.

The composition near the surface of the recording media of the present invention may be mixed with various components other than the olefin-maleic anhydride copolymer depending on the application. When only the olefin-maleic anhydride copolymer is coated on a support such as paper, crawling may appear within the coating and the coated film may contain defects.

In general, the olefin-maleic anhydride copolymer exhibits relatively significant toner repellency and proper fixing ability. In some cases, the olefin-maleic anhydride copolymer is required to lower the toner repellency by such factors as properties of image forming materials, conditions to utilize the recording media on which images are recorded, image-erasing ability of image erasing apparatuses, and fixing devices of image forming apparatuses. In such cases, the toner repellency may be reduced or the defects of coated films may be eliminated while repeatable durability is maintained, by way of mixing with a resin or polymer having substantially no toner repellency.

When the olefin-maleic anhydride copolymer is coated on supports of recording media in a form of an aqueous solution, water-soluble resins or emulsion resins dispersed in water are preferably employed as the polymer having substantially no toner repellency. Specific examples of the polymer include water-soluble resins such as starches, starch derivatives e.g. oxidized starches and starch phosphates, polymers containing acrylic acid, polymers of olefins having a carbon number of 11 or less and maleic anhydride, polyvinyl alcohols, alginic acid, Arabian gum, and gelatin; synthetic rubber latexes such as vinyl acetate emulsion, acrylic resin emulsion, natural rubber latex, styrene-acryl copolymers, and acrylonitrile-butadiene copolymers.

Among these polymers, starches, starch derivatives, and water-soluble acrylic resins are particularly preferable from the viewpoint that the intensity of toner repellency can be controlled stably, and defects due to crawling of coating liquids can be disappeared. Starches, starch derivatives, and water-soluble acrylic resins are preferably utilized at a content of 20% by mass to 80% by mass within the composition near the surface of the recording media.

When the content of the polymer is less than 20% by mass, the effect to decrease the toner repellency or to prevent the crawling is likely to be insufficient; and when the content of the polymer is more than 80% by mass, the quality of the recording media tends to be unstable such that the toner repellency is not desirable or slight fluctuation of production conditions leads to significant variation of fixing ability of resultant recording media.

The coating liquid to be coated near the surface of recording media may comprise a pigment in addition to the olefin-maleic anhydride copolymer and a polymer with no toner repellency, in order to raise the whiteness of the recording media, to drop the transparency, to adjust the friction coefficient, to color for distinguishing the recording media as reusable ones, and to improve writing property.

Preferable pigments are of white, and inorganic pigments such as kaolin, alumina, diatomite, barium sulfate, and silica are usually employed.

When the olefin-maleic anhydride copolymer is coated in a form of water-soluble resin, the olefin-maleic anhydride copolymer tends to coagulate through bonding with polyvalent metal ions contained within the inorganic pigments, since the olefin-maleic anhydride copolymer is an anionic polymer in this stage. Accordingly, organic pigments with no polyvalent cation are preferably employed so as to prevent the coagulation of coating liquid, when a water-soluble olefin-maleic anhydride copolymer is coated.

Examples of commercially available white organic pigments include crosslinked styrene polymers, styrene-butadiene copolymers, styrene-acryl copolymers, and urea resins. In particular, hollow particles of organic pigments may increase the opacity and afford a degree of resilience to the surface of paper, therefore the contact condition may be enhanced between an erasing member e.g. for peeling and recording media when images on the recording members are erased, thereby the erasing property may be improved. Further, when recording media are colored for distinguishing the recording media as reusable ones, the coating liquid may be free from coagulation by adding a small amount of an organic pigment such as phthalocyanine, thereby allowing stable coating.

Generally, paper based on cellulose fibers is employed for the support of electrophotographic recording media of the present invention. The recording media, prepared from conventional recording paper by way of including the olefin-maleic anhydride copolymer in an amount of sizing agent, typically exhibit poor toner repellency, thus images on the recording media are hardly erasable when the images are formed by conventional electrophotographic apparatuses.

One of the requirements for the recording media to display excellent image erasing property is smoothness higher than that of plain paper conventional for current electrophotographic apparatuses. Commercially available high quality paper of so-called fine paper having an irregularity similar to that of plain paper cannot typically exclude image forming materials to fix or adhere closely around cellulose fibers.

Accordingly, when image forming materials are erased from recording media on which images being recorded, proper erasing property cannot be afforded unless the fibers are removed along with the image forming materials. Therefore, even though the image forming materials could be erased, the repeatable erasing property certainly degrades due to napped surface of the recording media, consequently deteriorating the appropriate repeatability.

Preferably, the electrophotographic recording media of the present invention have a surface smoothness of 150 seconds or more, with respect to at least the surface on which images are recorded, by way of Japan TAPPI No. 5-B method for Oken smoothness value. The surface smoothness of 150 seconds or more may prevent the situation that toner particles independently penetrate into the pores of recording media when toner particles are transferred onto recording media in electrophotographic apparatuses, since the connection and volume of the pores are deficient, thus allowing appropriate erasion of images.

Preferably, the coating material that contains the olefin-maleic anhydride copolymer is applied on paper in an amount of 1 $g/m^2$ to 15 $g/m^2$, which is on the base of total mass of the material on both sides of the paper after drying, in order to attain an excellent image erasing property.

When the coated amount is less than 1 $g/m^2$, the image erasing may be inappropriate since the smoothness of the recording media is insufficient and/or the surface of recording media with which image forming materials contact cannot be uniformly coated with the coating material that contains the olefin-maleic anhydride copolymer. When the coated amount is more than 15 $g/m^2$, such a large coated amount brings about substantially no improvement in the image erasing property, but also the thicker coated film tends to yield small cracks due to the pressure of water vapor evaporated from inside of paper when the coated film is coated and dried, and/or heated at fixing portions of image forming apparatuses, which possibly makes difficult to erase the image forming materials within the cracks, consequently the repeatability may be deteriorated.

Further, larger coated amount leads to such defects as higher cost, higher transparency of recording media, and heavier paper mass. The optimum coated amount depends on smoothness, density or porosity of base paper, and composition of the coating liquid. It is preferable in general that the coated amount is 2.5 $g/m^2$ to 10 $g/m^2$ on the base of total mass on both sides of the paper after drying.

In the case that one side of recording media is recorded or the erasable images are recorded on only one side of recording media, the coating material containing the olefin-maleic anhydride copolymer may be provided on only one side of the support. When only one side of recording media is coated with the coating material containing the olefin-maleic anhydride copolymer, the coated amount of 0.5 $g/m^2$ to 7.5 $g/m^2$ may result in excellent image erasing property.

However, when only one side of recording media is coated with the coating material containing the olefin-maleic anhydride copolymer, the recording media tend to curl, in particular often curl after heating fixture by use of electrophotographic apparatuses, thus recording media cannot be stacked in order sometimes after discharging the recording media into the discharge portion of the electrophotographic apparatuses, or the recording media tend to wrinkle or crease at fixing portions. On the other hand, pigments do not easily disperse into the coating material containing the olefin-maleic anhydride copolymer.

Further, when paper is employed for the support, and the coating material containing the olefin-maleic anhydride copolymer is applied in a larger amount without pigments, the pores or voids within paper are likely to be replaced by the coating material; consequently, some problems may be induced that the transparency of the paper is raised and thus the visibility is deteriorated, or show-through occurs when recording media are stacked after images are recorded. In order to prevent such problems, preferably, a composition containing the olefin-maleic anhydride copolymer is coated after a filling layer is provided that contains a white pigment and a resin.

—Filling Layer—

The filling layer may bring bout a thinner layer of the coating material that contains the olefin-maleic anhydride copolymer. When the coating composition, having higher contents of the olefin-maleic anhydride copolymer, is coated into a relatively thick layer, the coated film has a tendency to generate cracks, thereby the repeatability is likely to degrade due to immersion of image forming materials into the cracks. Accordingly, the layer of the coating material containing the olefin-maleic anhydride copolymer is preferably as thinner as possible, provided that the surface of the recording media that contacts with the image forming materials is coated uniformly with the composition that contains the olefin-maleic anhydride copolymer.

The pigment or polymer for the filling described above may be properly selected without particular limitations, as long as the pigment or polymer exhibits adhesiveness against the base paper as well as the overlying composition that contains the olefin-maleic anhydride copolymer, without causing such problems as the pigment or polymer dissolves into the coating liquid of the composition to generate inferior coating or the pigment or polymer dissolves into the surface layer that contains the olefin-maleic anhydride copolymer.

White pigments are preferable for the pigment. For example, the pigment may be one or more of calcium carbonate, kaolin, talc, clay, titanium oxide, and zinc oxide. These pigments are preferred from the viewpoint that the opacity is higher, the whiteness is higher, the cost is lower, the adhesiveness is higher with the composition containing the olefin-maleic anhydride copolymer.

Preferable examples of the polymer include polyvinyl alcohols, starches, carboxymethylcelluloses, polyvinylacetate emulsions, acrylic resin emulsions, natural rubber latexes, and synthetic rubber latexes. One or more of these polymers or resins may afford preferable adhesiveness with the composition containing the olefin-maleic anhydride copolymer.

Preferably, the coated amount of the filling layer is 1 $g/m^2$ to 10 $g/m^2$ on the base of one side after drying. When the coated amount is less than 1 $g/m^2$, the smoothness of the recording media is insufficient, and also it is difficult to achieve proper erasing property of image forming materials. When the coated amount is more than 10 $g/m^2$, such problems may arise that cracks easily generate due to the pressure of water vapor evaporated from inside of paper, the cost is higher, and the mass of the paper is heavier.

When no filling layer is provided to the base paper, preferably, the amount of the composition containing the olefin-maleic anhydride copolymer is 1 $g/m^2$ to 5 $g/m^2$, which is on the base of total mass of the material on both sides after drying.

When the coated amount is less than 1 $g/m^2$, the surface of the recording media that contacts with the image forming materials is hardly coated with the composition uniformly that contains the olefin-maleic anhydride copolymer, thus resulting in insufficient image erasing property. When the coated amount is more than 5 $g/m^2$, such a large coated amount brings about substantially no improvement in the image erasing property, but also the thicker coated film tends to yield small cracks due to the pressure of water vapor evaporated from inside of paper, which possibly makes difficult to erase the image forming materials within the cracks, consequently the repeatability may be deteriorated. Further, such a large coated amount often brings about demerits such as higher cost, higher transparency of recording media, and heavier mass of paper.

The proper coated amount depends on such factors as the erasing performance of image erasing apparatuses, properties of image forming materials, and coated amount of the image forming materials. When the filling later is provided, even a small coated amount of the composition containing the olefin-maleic anhydride copolymer may lead to sufficient image erasing property, since the surface area of the recording media is reduced from that of the base paper.

In the case that the filling layer is provided, both sides of the paper do not necessarily require the filling layer and the composition containing the olefin-maleic anhydride copolymer. In the case that one side of the paper is provided with the filling layer and the composition containing the olefin-maleic anhydride copolymer, the coated amount for proper image erasing property is 0.5 $g/m^2$ to 2.5 $g/m^2$ on the base of after drying.

Figure 1B:
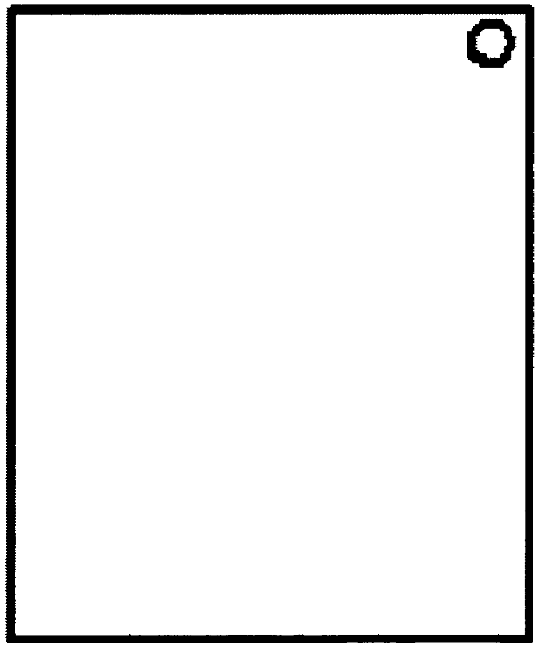
FIG. 1B is another exemplary view of identification information showing that the electrophotographic recording medium of the present invention is reusable.
Figure 1C:
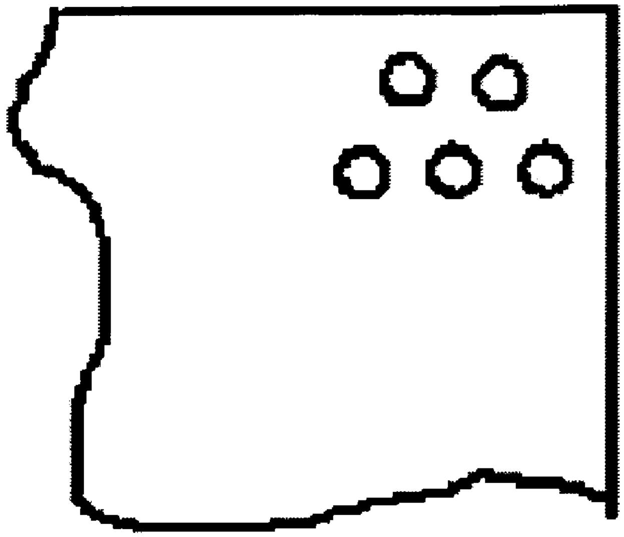
FIG. 1C is still another exemplary view of identification information showing that the electrophotographic recording medium of the present invention is reusable.
Figure 1D:
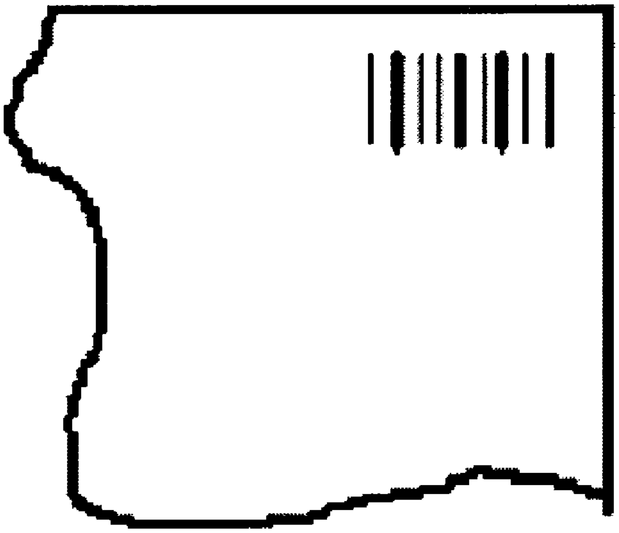
FIG. 1D is still another exemplary view of identification information showing that the electrophotographic recording medium of the present invention is reusable.

Preferably, the electrophotographic recording media of the present invention are marked information that notice reusable. Examples of the identification information to notice the reusability include as follows, a part of the recording medium is notched as shown in FIG. 1A; the recording medium is perforated as shown in FIGS. 1B and 1C; a part or all of the recording medium is colored with a dye or pigment; a bar-cord is printed as shown in FIG. 1D; a mark other than bar-cords is printed; printing is applied by use of an ink that absorbs a light of an invisible wavelength such as UV-rays or infrared rays, an ink that generate fluorescence, or a magnetic ink. In addition, the identification information may make use of irradiation sensitivity or an IC chip that generate an electromagnetic wave.

Preferably, the identification information that informs the electrophotographic recording medium to be reusable is not erasable while image information is recorded on the recording medium or images on the recording medium are erased. Preferably, image forming apparatuses can easily recognize and users can easily distinguish visually that the electrophotographic recording medium is reusable in the state that the recording medium is housed in paper-feed cassettes.

From these viewpoints and also considering easy workability, most preferable is a notch or hole. Namely, the notch or hole, provided into a sheet, can perform as identification information of reusable electrophotographic recording media, and allow for a combination of a light emitter and a light-receiving element to detect whether all of the sheets are reusable or not that are housed and stacked within a paper-feed cassette of image forming apparatuses or image erasing apparatuses.

Further, a super calendering may be effectively carried out after the filling layer is applied or after the composition containing the olefin-maleic anhydride copolymer is coated in order to enhance the smoothness of recording media and to improve the image erasing property.

<Method for Forming Image on Electrophotographic Recording Medium>

The reusable electrophotographic recording media of the present invention comprise the olefin-maleic anhydride copolymer in the composition near the surface, therefore, can represent an appropriate range of adhesiveness with image forming materials adapted to conventional image forming apparatuses, and can satisfy both of fixing property and erasing property of images. Accordingly, the processes for forming images on electrophotographic recording media of the present invention, composition of image forming materials, image forming process are not particularly restricted by the reusable electrophotographic recording media of the present invention.

The electrophotographic recording media of the present invention may represent proper fixing property as well as excellent image erasing property in particular by use of image forming materials in a form of thermoplastic power and image forming apparatuses that can fix the powder of image forming materials formed on recording media by making contact the image forming materials with a fixing member heated to 100° C. or higher.

Examples of the method for forming images are a method in which images are formed on a photoconductor and image forming materials are directly transferred to recording media; a method in which image forming materials are once transferred from a photoconductor to an intermediate transfer member and then transferred to recording media; a method in which electrostatic latent images are written to an electrostatic recording member having a dielectric layer by use of a needle electrode or ion stream, the latent images are developed with image forming materials and is then transferred from the electrostatic recording member to recording media; and a toner jet method in which a toner is deposited on the recording medium while controlling the voltage applied to a grid to control the movement of the toner.

It is evident from the constitution of the present invention that the working-effect of the present invention similarly extends to every method described above. Further, it is evident that the recording media of the present invention can be applied, in addition to the electrophotographic methods, to magnetic recording methods in which the image forming materials in a form of power with thermoplasticity are employed and image forming methods in which hot-melt solid inks are employed, thereby proper fixing property and excellent image removing property are attained.

Such factors as composition of the image forming material, final means to fix the image forming material onto the recording medium, and means to remove images dominantly affect the proper fixing property and excellent image removing property rather than the method for forming images. It is preferred in particular that image forming materials with thermoplasticity are employed so as to record images properly on recording media of the present invention and to remove the image forming materials appropriately from the recording media.

The resin component of the image forming materials with thermoplasticity may be selected from conventional electrophotographic toner materials; examples of thermoplastic resins for representing the thermoplasticity include polyester resins, polystyrene, poly-p-chlorostyrene, styrene-p-chlorostyrene copolymers, styrene-propylene copolymers, styrene-vinyltoluene copolymers, styrene-vinylnaphthalene copolymers, styrene-methyl acrylate copolymers, styrene-ethyl acrylate copolymers, styrene-butyl acrylate copolymers, styrene-octyl acrylate copolymers, styrene-methyl methacrylate copolymers, styrene-ethyl methacrylate copolymers, styrene-butyl methacrylate copolymers, styrene-methyl α-chloromethacrylate copolymers, styrene-acrylonitrile copolymers, styrene-vinyl methyl ketone copolymers, styrene-butadiene copolymers, styrene-isoprene copolymers, styrene-acrylonitrile-indene copolymers, styrene-maleic acid copolymers and styrene-maleic ester copolymers; poly(methyl methacrylate), poly(butyl methacrylate), poly(vinyl chloride), poly(vinyl acetate), polyethylene, polypropylene, polyesters, epoxy resins, epoxypolyol resins, polyurethanes, polyamides, poly(vinyl butyral), poly (acrylic acid) resins, rosin, modified rosin, terpene resins, aliphatic or alicyclic hydrocarbon resins, and aromatic petroleum resins. Preferably, the content of these resin components is 50% by mass to 99.5% by mass, and more preferably is 80% by mass to 97% by mass in the image forming material.

In order to display proper fixing property and excellent erasing property of image forming materials, the thermoplastic resin in the image forming materials should essentially have a glass transition temperature (Tg), melting temperature, and viscoelastic properties within suitable ranges. The glass transition point is preferably from 40° C. to 100° C. and more preferably from 50° C. to 70° C. Within this range, image forming materials can be fixed to and removed from recording media at relatively low temperatures and can be stored stably. Preferably, the storage elastic modulus of the thermoplastic resin is such that the temperature achieving a storage elastic modulus of 10,000 $dyne/cm^2$ at a measurement frequency of 20 Hz stands at 80° C. or higher, and more preferably at 90° C. to 160° C.

The thermoplastic resins for use in image forming materials are preferably polyester resins or styrene-acrylic resins in particular. The polyester resins or styrene-acrylic resins in image forming materials may affect the physical properties within appropriate ranges and also lead to proper adhesiveness between the recording media of the present invention and image forming materials, thus proper fixing property and excellent image erasing property may be attained, and also the fixing property and the image erasing property tend to undergo less alteration during repeated forming and erasing of images.

On the recording media of the present invention, color images may be formed by use of image forming materials that include a colorant additionally. The colorant may be selected from dyes and pigments. Examples of the colorant for thermoplastic image forming materials include black pigments such as carbon black and iron oxide; yellow colorants such as C. I. Pigment Yellow 12, C. I. Pigment Yellow 13, C. I. Pigment Yellow 14, C. I. Pigment Yellow 15, C. I. Pigment Yellow 17, C. I. Pigment Yellow 93, C. I. Pigment Yellow 94, C. I. Pigment Yellow 138, C. I. Pigment Yellow 155, C. I. Pigment Yellow 156, C. I. Pigment Yellow 180, and C. I. Pigment Yellow 185; magenta colorants such as C. I. Pigment Red 2, C. I. Pigment Red 3, C. I. Pigment Red 5, C. I. Pigment Red 16, C. I. Pigment Red 48:1, C. I. Pigment Red 53:1, C. I. Pigment Red 57:1, C. I. Pigment Red 122, C. I. Pigment Red 123, C. I. Pigment Red 139, C. I. Pigment Red 144, C. I. Pigment Red 166, C. I. Pigment Red 177, C. I. Pigment Red 178, and C. I. Pigment Red 222; and cyan colorants such as C. I. Pigment Blue 15, C. I. Pigment Blue 15:2, C. I. Pigment Blue 15:3, C. I. Pigment Blue 16, and C. I. Pigment Blue 60.

Preferably, the content of the colorant is 0.5% by mass to 20% by mass, more preferably is 1% by mass to 10% by mass in the powder of the image forming material.

The image forming materials may further comprise conventional additives such as charge control agents, releasants, and external additives depending on requirements. Examples of the charge control agents are nigrosine dyes, triphenylmethane dyes, molybdic acid chelate pigments, rhodamine dyes, alkoxy amines, quaternary ammonium salts, fluorinated surfactants, metal salts of salicylic acid, and metal salts of salicylic acid derivatives.

The releasant described above is added in order to prevent so-called hot offset, i.e. adhesion of the image forming materials to image fixing rollers or image fixing belts during image fixing process. Examples thereof are waxes having a melting point from 60° C. to 110° C., such as carnauba wax, montan wax, beeswax, paraffin wax, and microcrystalline wax. The releasant is usually included in a content of less than 10% by mass, thereby the image forming materials may under go less alternation in fixing property and exhibit image erasing ability under repeated forming and erasing of images on recording media of the present invention.

The external additive described above is added in order to enhance the flowability of the powder of the image forming materials, to stabilize the feeding of image forming materials into developing devices, to improve the developing property by modifying the stirring ability of image forming materials within developing devices, or to compensate the charging ability. Usually the external additive is blended so as to cover the surface of particles that contain a colorant, resin particles, a releasant etc.

Examples of the external additive include inorganic fine particles such as silica, alumina, titanium oxide, barium titanate, magnesium titanate, calcium titanate, strontium titanate, zinc oxide, tin oxide, silica sand, clay, mica, wollastonite, diatomaceous earth, chromium oxide, cerium oxide, iron red, antimony trioxide, magnesium oxide, zirconium oxide, barium sulfate, barium carbonate, calcium carbonate, silicon carbide, and silicon nitride.

These fine inorganic particles preferably have a primary particle diameter of 2 nm to 500 nm, more preferably 5 nm to 50 nm. The amount of the fine inorganic particles in the powdery image forming material is preferably 0.01% by mass to 5% by mass, more preferably 0.01% by mass to 2.0% by mass based on the total mass of the image forming material.

The image forming materials adapted to the present invention are not limited to powder, but may be a developer for liquid developing processes, heat-transfer ribbon ink, or thermoplastic solid ink for inkjet processes. In the case of powdery image forming materials, images may be properly formed on and erased from recording media of the present invention when the volume average particle size of the powdery image forming material is 3 μm to 15 μm, but not limited to.

The powder of image forming materials may be produced currently by polymerization processes other than conventional milling processes. The powder of image forming materials produced by the polymerization process is controllable for the shape and the shape is nearly spherical contrary to the powder of forming materials produced by the milling processes that has an angular shape.

The polymerization process is typically more controllable in terms of particle size distribution, shape distribution, and charging property distribution of image forming materials than the milling process by way of controlling polymerization conditions and flocculation conditions; therefore, the powder of image forming materials produced by the polymerization process can attain higher quality of images and enhance reliability. The recording media of the present invention may be adaptive to substantially any powders of image forming materials that are produced by milling processes or conventional chemical processes such as dispersion polymerization and suspension polymerization processes.

In order to fix the image forming materials onto the recording media of the present invention by use of the powder of image forming materials with plasticity, preferably, the image forming material is pressed onto the recording media and heated by use of a fixing member heated to 100° C. or higher. Although the level of fixing power to recording media depends on process speed, heating period, pressure etc., when the image recording material is heated by a heating member of less than 100° C., sufficient fixing property hardly generate on image recording media of the present invention.

Preferably, the heating temperature of the fixing member is 100° C. to 240° C. Although it is not necessarily easy to determine the actual temperature of the image forming material formed on the recording medium when the heating and pressing is conducted by use of the fixing member of 100° C. to 240° C., it is considered that the temperature of the image forming material on the recording medium is preferably heated to 80° C. to 160° C.

Preferably, users can optionally distinguish the way to utilize the recording media of the present invention between a mode in which printing is performed such that the image is erased when the image information turns into unnecessary and then the recording medium is to be reused (hereinafter referring to as "first printing mode") and another mode in which printing is performed in a usual manner (hereinafter referring to as "second printing mode"); when a user select the first printing mode, the image forming apparatus provides a means to control so as to form images that are certainly erasable. Recently, information is often stored on recording media as digital electronic information rather than on paper owing to the fact that high-capacity recording media have been widely spread such as hard disc drives of magnetic recording and optical disks that record information through phase change of recording layers by optical effect or destroy of recording layers, or information can be inputted and outputted rapidly due to progress in integrated circuits. The information stored as digital electronic information may provide such benefits as remarkably easy information search, extremely less space for storing compared to storing as paper information, and easy delivery and access of information.

On the other hand, when the information stored as digital electronic information is accessed through a display, there exist such disadvantages that the outline of entire information is hardly read through compared to paper information, underlines cannot be drawn at important parts, and insertions cannot be written. Further, images on displays have deficiencies currently that the resolution is lower and the quality is poor compared to images printed by printers, and access for a long time typically put an enormous burden on eyes.

Accordingly, the information searched from accumulated data base is often printed on paper temporally and then the information is viewed.

When information is utilized in such a manner described above, information itself is stored in data base, thus can be searched and outputted at any time easily. In such a case, before the information is printed on the paper, users can recognize that the information recorded on paper is unnecessary to store after the information is viewed. Accordingly, a control means is beneficially provided to the image forming apparatus for printing information that can optionally distinguish between a mode in which the image is erased when the image information turns into unnecessary and then the recording medium is reused (first printing mode) and another mode in which printing is performed in a usual manner (second printing mode), and when a user select the first printing mode, the image forming apparatus provides a means to control so as to form images that are certainly erasable.

Conversely, if information printed in the second mode is erased easily, such abuses or falsifications are allowable that a part of images are rewritten or other information is written on the sheet while remaining a signature or seal image, therefore, the images printed under the second printing mode are preferably not erasable. Namely, the composition of image forming materials and fixing conditions in image forming apparatuses are preferably arranged such that images printed on plain paper under the second mode are free from erasing.

When the image forming apparatus equipped with a control means that allows for users to select optionally the first printing mode or the second printing mode is designed such that the reusable electrophotographic recording media is printed under the first printing mode, the printed paper of the first printing mode can be certainly made erasable for the image forming materials.

For example, the image forming apparatus is provided with a paper-feed cassette enclosing electrophotographic recording media of the present invention and a paper-feed cassette enclosing usual paper, a transport unit that transports either of the recording media or the usual paper after selecting them, and a control unit that directs to select and to transport the reusable electrophotographic recording media of the present invention toward the image forming unit in the first printing mode and directs to select and to transport the usual paper in the second printing mode; thereby images can be certainly erased when the first printing mode is selected, and image can be hardly erasable when the second mode is selected.

In order to make possible that images can be surely erased when the first mode is selected and that hardly erasable images can be formed when the second mode is selected, it is essential that electrophotographic recording media of image-erasable and reusable are certainly selected and transported to the image forming unit when the first mode is selected, and printing is excluded from the electrophotographic recording media of image-erasable and reusable in the second mode. Accordingly, it is preferred that the controlling unit of image forming apparatus can detect whether or not the electrophotographic recording media of image-erasable and reusable can be supplied in the image forming apparatus when users generate a signal to require printing.

When identification information is provided to the electrophotographic recording media for informing to be reusable, in particular when the information is transmitted by holes or notches in the recording media, whether or not only the reusable electrophotographic recording media are set within the paper-feed cassette can be detected, for example, by mounting a light emitter and a light receiver such that a light transmit through the entire holes or notches of the electrophotographic recording media stacked and housed within the paper-feed cassette of the image forming apparatuses.

Users can certainly take image-erasable printings by providing a control unit that performs to detect and determine whether or not reusable electrophotographic recording media can be supplied in image forming apparatuses in the stage that users turn on or click a switch of printing requirement by use of a user-interface of image forming apparatuses prior to forming images on image recording media, then prohibits to form images in the first printing mode, and also advises users to set the reusable electrophotographic recording media within the cassette.

<Image Erasing Method by Use of Reusable Electrophotographic Recording Media>

The reusable electrophotographic recording media of the present invention comprise an olefin-maleic anhydride copolymer within the composition near the surface, thus can exhibit appropriate adhesiveness with image forming materials utilized in conventional electrophotographic apparatuses and satisfy both of the image fixing ability and image erasing ability. Accordingly, the method for erasing images formed on electrophotographic recording media is not restricted by particular limitations.

The specific methods for erasing image forming materials on recording media are as follows. Firstly, the method is exemplified that utilizes transfer derived from heating and pressuring. More specifically, a recording medium on which images are recorded and a peeling member that exhibits adhesiveness with image forming materials are overlapped and pressed in a condition that the image forming materials are heated to soften, then the recording medium and the peeling member are separated, thereby the images on the recording medium are separated and removed by way of transferring the image forming materials from the recording medium to the peeling member. Examples of the methods that utilize transfer derived from heating and pressuring are dry methods that perform transferring operation without applying a liquid to the recording medium on which images are recorded, and wet methods that apply organic solvents or aqueous solutions containing surfactants, for example, to the recording medium prior to transferring operation, thereby to soften or dissolve a part of image forming materials or swell the image forming materials or the recording medium.

Secondly, the method for erasing image forming materials may be a sticky transfer method that erase image forming materials without heating by use of a sticky peeling member.

Thirdly, the method for erasing image forming materials may be a rubbing-erasing method that rubs and erases image forming materials on recording media by use of a brush, a blade formed from one of glasses, metals, rubbers, thermoplastic resins, and silicones, a roller or belt formed from one of cloths, rubbers, and papers.

The rubbing-erasing methods are classified into dry rubbing-erasing methods that perform rubbing operation with applying no liquid onto recording media on which images are formed and wet rubbing-erasing methods that apply organic solvents or aqueous solutions containing surfactants, for example, to the recording medium prior to rubbing operation, thereby to soften or dissolve a part of image forming materials or swell the image forming materials or the recording medium.

Among the methods for erasing image forming materials described above, dry heating-pressing transfer methods and dry rubbing-erasing methods are preferred for erasing images when the electrophotographic recording media of the present invention are employed.

The wet heating-pressing transfer methods, which apply an organic solvent or surfactant-containing aqueous solution to recording media prior to transfer operation, may reduce adhesive strength between image forming materials and recording media through swelling the image forming materials or recording media by way of applying an organic solvent or surfactant-containing aqueous solution to recording media on which images are formed; therefore are preferable methods for adjusting the fixing ability of images and enabling the image erasion.

However, the wet heating-pressing transfer methods require supplying an exclusive liquid for promoting image erasion for users as an accessory. Further, the image forming apparatus tends to be complex in the construction, large-sized and expensive since the liquid for promoting image erasion should be applied uniformly onto recording media during the image erasing process. Further, when the liquid containing water is applied to recording media during the image erasing process, moisture content and/or latent stress is likely to be nonuniform in the regenerated recording media, the recording media tend to occur curls during reuse thereof within image forming apparatuses in particular during heating at fixing portions, thereby troubles often occur such that the recording media generate winkles or jams in apparatuses. The recording media of the present invention may achieve to erase image forming materials from recording media by way of the dry heating-pressing transfer methods with no use of the liquid for promoting image erasion while assuring proper fixing ability of image forming materials onto recording media, thus enabling image erasion even with simple constitution of image erasing units.

Wet rubbing-erasing methods have deficiencies similar with those of wet heating-pressing transfer methods described above. Further, one of rubbing-erasing methods is previously proposed that adds an image-erasing promoter such as organic solvents to dissolve completely image forming materials. However, the organic solvent utilized for an image-erasing promoter generates necessarily solvent vapor, which makes the method impractical due to problems in terms of safeness and healthy. The recording media of the present invention make possible to fix appropriately the image forming materials on the recording media as well as to erase image forming materials from the recording media by way of the dry rubbing-erasing method with no use of the image-erasing promoter.

In particular, when a rubbing method is employed that utilizes rotating spiral blades for rubbing the recording media, the easing device can take the benefits of transport ability of recording media and high image-erasing quality, since the images can be erased successfully while maintaining less resistance to transport the recording media.

<Image Forming Apparatus>

Figure 4:
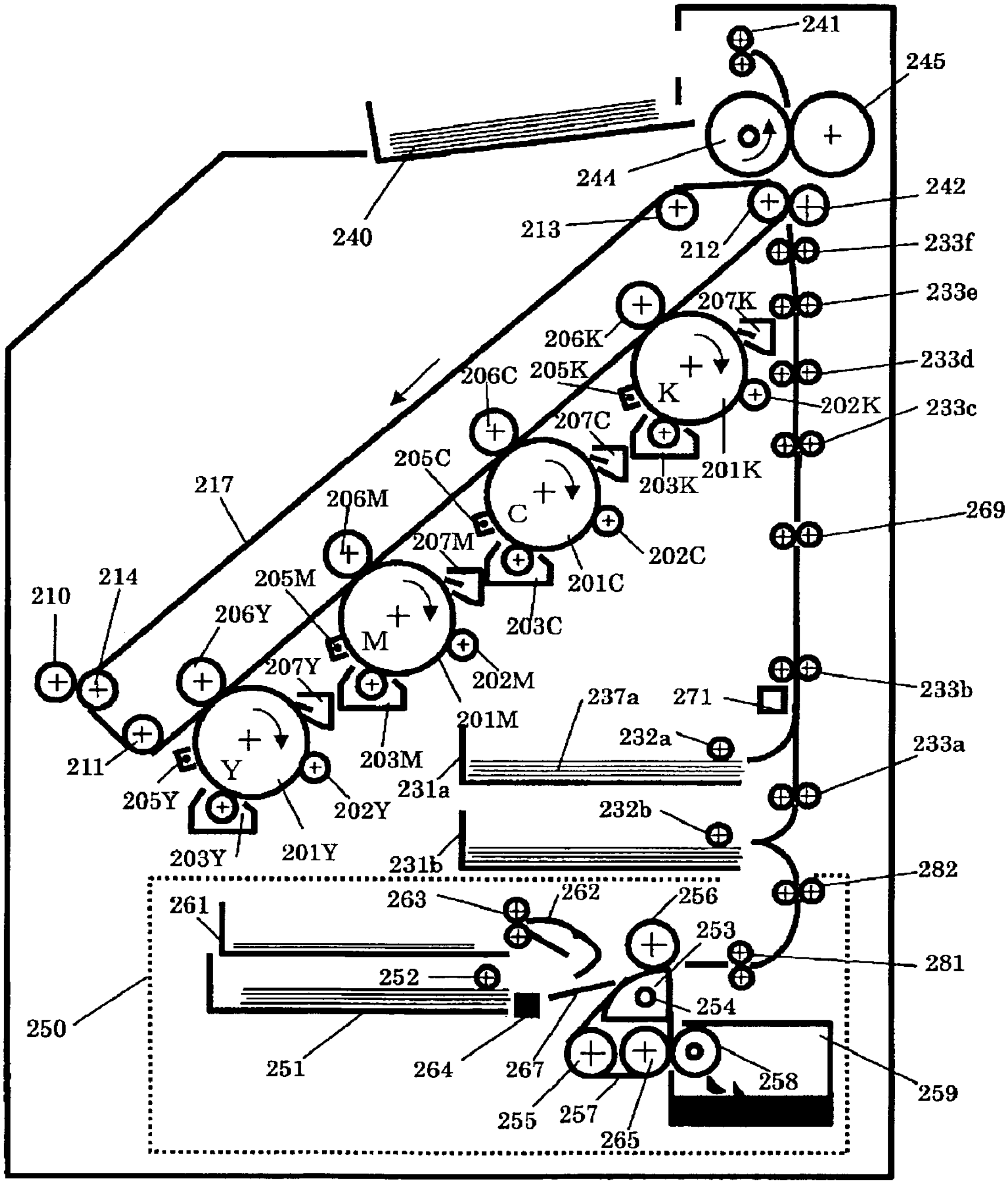
FIG. 4 shows an exemplary image-erasing system in which an image forming apparatus that forms an image by an electrophotographic method and an image erasing apparatus are enclosed in a housing.

The image forming apparatuses adapted to the present invention will be illustrated in more detail as follows. FIG. 4 illustrates an example of the image forming-erasing system, in which an image forming apparatus for forming an image by electrophotography, and an image erasing device are housed in one cabinet.

The image forming apparatus in FIG. 4 is an electrophotographic image forming apparatus, in which images are formed in the following manner: yellow (Y), magenta (M), cyan (C) and black (K) images are formed on different photoconductors respectively, the images formed in the different stations are transferred onto an intermediate image-transfer member 217, the transferred images on the intermediate image transfer member 217 is transferred onto a recording medium 237 which is conveyed from a recording medium storage casing 231, and the powdery images formed from image-forming materials are fixed to the recording medium 237 by thermal image-fixing using an image-fixing roller 244. Such an electrophotographic color image forming apparatus is conventional as a tandem color electrophotographic apparatus.

The yellow (Y), magenta (M), cyan (C) and black (K) image-forming stations comprise the following conventional components for electrophotographic apparatuses. Specifically, the image-forming stations comprise, for example, photoconductors 201 [201Y, 201M, 201C and 201K], charging means 202 [202Y, 202M, 202C and 202K] for uniformly charging the photoconductors 201, light irradiation means (not shown), developers 203 [203Y, 203M, 203C, 203K], corona wire charges 205 [205Y, 205M, 205C, 205K], means 206 [206Y, 206M, 206C, 206K] for applying an electric field, and cleaning means 207 [207Y, 207M, 207C, 207K]. The photoconductors 201 are in the form of a drum or belt and each comprise a support typically made of a metal, and a photoconductor layer and/or protective layer arranged on the surface of the support.

The charging means 202 comprise, for example, a charger roller or a wire charger. The light irradiation means serves to apply light to the uniformly charged photoconductors in accordance with images to be formed and comprises, for example, a laser system, an LED, luminophor-liquid crystal light valve, and an optical system for conventional analog copying machines, in which light is applied to a document on a document table and the resulting reflected light is fed to a photoconductor. The developers 203 each have, for example, a magnetic roller and/or toner conveying roller inside thereof and serve to develop latent electrostatic images formed by light irradiation with powdery toners to hereby form visible images. The corona wire chargers 205 serve to control the charge of the powdery images formed on the photoconductors 201. The means 206 are in the form of a roller or corona wire and serve to apply an electric field to thereby transfer the powdery images from the photoconductors 201 to an intermediate transfer belt. The cleaning means 207 serve to remove powdery toners remained on the photoconductors 201 after image transfer. The image forming apparatus may further comprise any suitable known components according to necessity in addition to these components.

Examples of such additional components are charge-eliminating means, such as an AC charger and light irradiator, for eliminating the charge on the photoconductors 201 after image transfer; and controlling means for detecting the charge voltage applied to the photoconductors 201 in combination with control means for controlling the voltage applied to the chargers 202 so as to keep the surface potentials of the photoconductors 201 at constant level even in varying environmental conditions or in deterioration due to repetitive use. When toner removal from the photoconductors 201 after image transfer is not required, the cleaning means 207 [207Y, 207M, 207C, 207K] can be omitted. Likewise, when there is no need of charging the powdery images formed on the photoconductors 201, the corona wire chargers 205 [205Y, 205M, 205C, 205K] can be omitted.

The intermediate transfer belt 217 is arranged so that rollers 211, 212, 213 and 214 are in contact with the inner wall thereof. A mechanism for applying tension (not shown) applies a suitable tension to the intermediate image-transfer belt 217. The intermediate image-transfer belt 217 has means 210 for eliminating powder deposited on the surface of the belt, such as a brush or roller. The image forming apparatus further comprises charge eliminating means and/or charging means for eliminating or uniforming the charge remained on the intermediate transfer belt after image transfer to the recording medium, depending on requirements.

The recording medium on which an image is finally formed is housed in recording medium storage casings 231 [231*a* and 231*b]* and is fed to a paper conveying system by action of paper-feed rollers 232 [232*a* and 232*b]* and is conveyed via pairs of paper-feed rollers 233 [233*a*, 233*b*, 233*c*, 233*d*, 233*e* and 233*f]*. The powdery image is transferred from the intermediate image-transfer belt 217 to the recording medium by action of means 242 for applying an electric field, such as a voltage applying roller or a corona wire charger.

The image-forming material transferred to the recording medium is fixed thereto by action of image-fixing means typically comprising heat roller or heat belt 244 and pressure roller 245. The recording medium bearing the fixed image is ejected via a pair of output rollers 241 to output tray 240.

Figure 2:
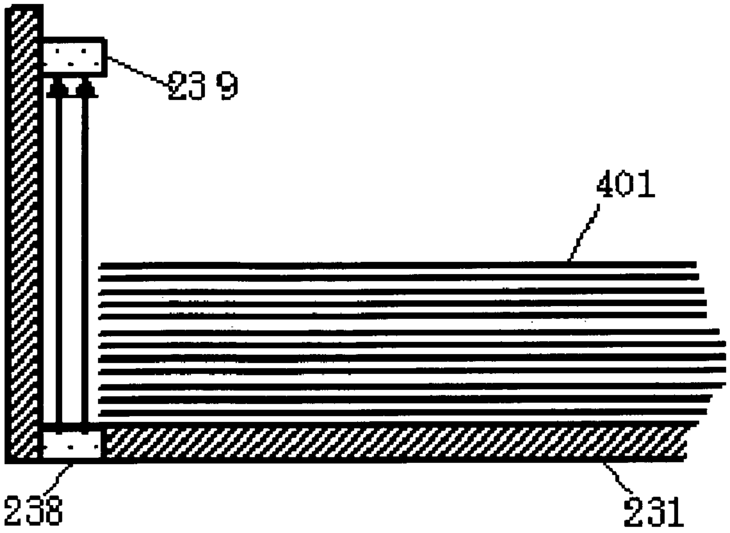
FIG. 2 is an enlarged view of a rear end of a paper-feed cassette observed in paper-feed direction.

FIG. 2 is an enlarged view of the tail of the recording medium storage casing 231 when viewed from the feed direction. Light-emitting device 238 and light-receiving device 239 are arranged in the vicinity of a side edge at the tail of the recording medium storage casing 231 and serve to detect whether or not the recording medium 401 has at least one of notches and holes. The light-receiving device 239 receives light and transmits a signal to control means (not shown) for determining the presence or absence of an image-erasable recording medium. In this control means, the limit was set such that the control means does not determine that image formation on an image-erasable recording medium can be carried out unless all of the recording media housed in the recording medium storage casing are image-erasable recording media. In other words, even if only one regular recording medium other than image-erasable recording medium is housed in the storage casing, the control means does not determine that image formation on an image-erasable recording medium can be carried out.

The image forming apparatus exemplified in FIG. 4 has two recording medium storage casings 231*a* and 231*b*, of which the recording medium storage casing 231*b* serves to house an image-erasable recording medium. The number of the recording medium storage casing can be suitably set, for example, so as to house recording media of different sizes or to house sheets of a recording medium in different feed direction (longitudinal feed direction and transverse feed direction). The user can select an image-forming mode from the first image-forming mode and the second image-forming mode arbitrarily, for example, at a control panel (not shown) of the image forming apparatus or at a user interface shown in a display connected to a computer which is connected to an image forming apparatus as shown in FIG. 4. In the control panel or the user interface, the first image-forming mode may be indicated, for example, as a button or a selection choice marked as "Reuse", "Paper Reuse", "Reuse Mode ", "Dedicated Paper", "Reusable Paper", "Resource Saving", "Short-term Perusal " or "Short-term Use". The second image-forming mode may be indicated, for example, as a button or a selection choice marked as "Image-fixing Mode ", "High Image-fixing", "Fix Mode ", "Plain Paper", "Unused Paper", "Document Storage" or "External Distribution". The selection of the image-forming mode can also be set, for example, so that a higher priority is given to the first image-forming mode, the first image-forming mode is automatically selected unless the user takes an action, and the user takes an action to select the second image-forming mode only in the case where the user wants to form an image according to the second image-forming mode.

Upon manual or automatic selection of the first image-forming mode by the user, the control unit of the image forming apparatus determines the presence or absence of an image-erasable recording medium and whether or not a printing mode, such as double-sided printing, in which image formation according to the first image-forming mode is prohibited, is selected. Use of a stapler or opening of holes for filing often inhibits reuse of the recording medium, therefore; when such a stapler or means for forming holes for filing is connected to and controlled by the image forming apparatus, the control unit of the image forming apparatus is preferably so configured as to prohibit the use of the stapler or the means for forming holes for filing upon image formation according to the first image-forming mode.

The image forming apparatus shown in FIG. 4 includes reflective light-emitting and light-receiving devices 271 for detecting and confirming whether or not the conveyed recording medium from the recording medium storage casing is an image-erasable recording medium. The light-emitting and light-receiving devices 271 are not essential, since the image forming apparatus has the detecting means for detecting whether or not a recording medium housed in the storage casing is an image-erasable recording medium. These devices are arranged as a fail-safe system for avoiding image formation on a regular recording medium other than image-erasable recording media, even when there is an error in the detection of the detecting means in the storage casing. The control means control the image forming apparatus in the following manner.

When no recording medium-identification information, such as a notch or hole, for indicating as being an image-erasable recording medium is detected on the fed recording medium, the image forming operation of the image-forming unit is stopped, and the fed recording medium is ejected to an output tray without image formation. When a printing command for forming images on plural sheets of recording medium is made and no recording medium-identification information is detected on the fed recording medium, feeding of a successive sheet of the recording medium is prohibited, and an indication that an image-inerasable recording medium is detected is shown in the control panel or the user interface.

A mode-identification mark for indicating as image formation according to the first image-forming mode is formed on the recording medium upon image formation after manual or automatic selection of the first image-forming mode. The mode-identification mark, for example, is a bar code 403 shown in FIG. 3 and is printed according to a process for forming an erasable image as in other image information 402. When the image forming apparatus employs, for example, an electrophotographic image forming method, light emission of laser or LED, or opening/closing of a shutter element such as a liquid crystal is controlled by means for generating an identification pattern signal thereby form a latent electrostatic image of the identification pattern on a photoconductor. The latent electrostatic image is then developed in a developer to form a visible identification pattern.

Figure 3:
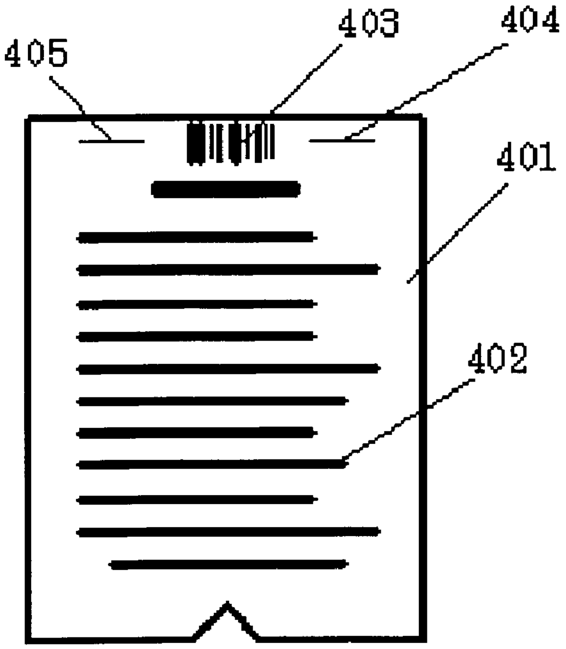
FIG. 3 shows an identification mark on an electrophotographic recording medium indicating that an image is formed according to the present invention.

In a color image forming apparatus as shown in FIG. 3, the mode-identification mark to inform that the image is formed in the first mode is formed to be readable for the image erasing device. For example, the mode-identification mark may be formed as a black identification pattern, which may invite no color drift and result in a higher contrast mark, allowing the image erasing device to read it easily. The mode-identification mark may comprises means for printing a language message at a position 404 or 405 in FIG, as the bar code 403 on the recording medium in FIG. 3, such as "Printed in a reuse mode", "Printed in a short-term use mode", "Erase the image after use", and "Printed in an eco-friendly printing mode". It is important that such a language message can be recognized by the image erasing device.

<Image Erasing Device>

The specific example of image erasing method or device will be explained in the following that is on the base of the dry heating-pressing transfer described above.

An area surrounded by a dotted line 250 in FIG. 4 is the image erasing device. The image erasing device comprises, for example, recording medium storage casing 251, paper-feed rollers 252, aluminum block 253, tension roller 255, belt-shaped stripping member 257, pressure roller 256, spiral cleaning blade 258, casing 259, pair of conveying rollers 281 and 282, detecting means 264, storage casing 261, guide plate 262, movable guide plate 267, and a pair of output rollers 263. The storage casing 251 serves to house a recording medium to be subjected to image erasing. The paper-feed rollers 252 serve to deliver the recording medium to the image erasing unit. The aluminum block 253 includes a halogen lamp 254 as a heat source. The belt-shaped striping member 257 is span around the aluminum block 253, a tension roller 255 and a cleaning backup roller 265 and is made from a metal such as nickel or stainless steel, or a polymeric compound such as poly(ethylene terephthalate), polyimide, aramid, poly(ethylene naphthalate) or poly(ether ether ketone). The pressure roller 256 is made typically from stainless steel, aluminum or iron, has an elastic member on its surface and serves to pressurize the conveyed and heated recording medium and the stripping member 257. Examples of a material for the elastic member are silicone rubber, fluorocarbon rubber and polyurethane rubber. The cleaning blade 258 serves to eliminate the image-forming material from the stripping member 257, which image-forming material has been transferred from the recording medium. The casing 259 serves to store the image-forming material eliminated from the stripping member 257. The pair of conveying rollers 281 and 282 serves to convey the recording medium after image erasing to the recording medium storage casing 231 of the image forming device. The detecting means 264 serves to detect the presence or absence of the mode-identification mark for indicating an image as being formed according to the first image-forming mode in the image forming apparatus. The storage casing 261 serves to house a recording medium from which the image is not erased. The guide plate 262 and the movable guide plate 267 serve to guide the recording medium to the storage casing 261.

The recording medium to be subjected to image erasing is housed in the recording medium storage casing 251. The recording medium storage casing 251 herein has a pair of a light-emitting device, light-receiving device for detecting the recording medium-identification information, such as notches, as in the recording medium storage casing 251 of the image forming apparatus. When the recording medium has notches as the recording medium-identification information in two corners, sheets of the recording medium are aligned and set in the storage casing 251 so that the notches stand at the tail of the sheets. The image erasing device herein also comprises control means for displaying a message of "Paper from which the toner cannot be eliminated is housed in the storage casing" in the control panel unless the detecting means detects that all the recording media housed in the recording medium storage casing 251 have the recording medium-identification information such as notches.

The housed recording medium is delivered to the image erasing unit by action of the feed rollers 252. The detecting means 264 for detecting the presence or absence of the mode-identification mark is, for example, an image sensor comprising a line sensor or CCD and capable of reading an image pattern. The detecting means 264 serves to a mode-identification mark, for example, at the center part of the tip of the fed recording medium, compare the read pattern with an identification pattern recorded in a memory of the control means and decide to allow or prohibit an image erasing operation.

A recording medium which has been identified as having the mode-identification mark is conveyed into between the belt-shaped stripping member 257 and the pressure roller 256 while being guided by the movable guide plate 267. The belt-shaped stripping member 257 is heated by the halogen lamp 254 in the aluminum block 253. The surface temperature of the aluminum block 253 is detected by temperature detecting means (not shown) such as a thermistor, a thermocouple, a platinum resistance thermometer or a thermal radiation measuring instrument. The detected surface temperature is inputted into temperature control means (not shown). The temperature control means compares the inputted surface temperature with a predetermined temperature and controls the operation of means (not shown) for changing the power supply to the halogen lamp 254 to thereby maintain the surface temperature at constant. The surface temperature is generally set at about 50° C. to about 200° C., and preferably at about 90° C. to about 130° C. for eliminating or erasing an image formed from a regular electrophotographic toner.

The image-forming material on the recording medium is heated by action of contact with the heated belt-shaped stripping member 257. Pressure means (not shown) serves to apply a pressure between the belt-shaped stripping member 257 and the pressure roller 256 typically by action of a spring, hydraulic pressure or air pressure. Thus, the recording medium bearing the image-forming material on its surface and the stripping member 257 are pressurized so that the image-forming material is in contact with the stripping member 257. The image-forming material on the recording medium is attached to the stripping member 257 by action of heat and pressure. An edge of the aluminum block 253 downstream from the pressure roller 256 has a curvature of about 1 to 5 mm in terms of radius. The belt-shaped stripping member 257 is conveyed along this curve and is separated from the recording medium due to the rigidity of the recording medium.

The reusable electrophotographic recording medium is so configured as to have an adhesive strength to the image-forming material weaker than that of the stripping member 257, therefore, once the recording medium is separated from the stripping member 257, the image-forming material is transferred from the recording medium to the surface of the stripping member 257, thus the image-forming material is eliminated or erased from the recording medium. The image-forming material transferred from recording medium to the stripping member is then scraped off by the rotating spiral cleaning blade 258 and is stored in the image-forming material storage casing 259. The recording medium after image erasing is ejected into the recording medium storage casing 231*b* of the image forming apparatus by action of the pair of conveying rollers 281 and 282. By action of a hoisting and lowering mechanism (not shown), the feed roller 232*a* of the image forming apparatus ascends and stands at such a position as not to inhibit the storage of the recording medium into the recording medium storage casing 231*b*, when the recording medium after image erasing is ejected from the image erasing device. The feed roller 232*a* descends and rotates to an opposite direction to the feed direction of the recording medium upon image formation at the time when no more recording medium is conveyed by the pair of conveying rollers 282. Thus, sheets of the recording medium ejected from the image erasing device are fully stored in the recording medium storage casing 231*b*.

When the detecting means 264 determines that the recording medium in question has no mode-identification mark based on the signal inputted into the detecting means 264, the movable guide plate 267 is rotated by rotating means (not shown) and guides the recording medium toward the guide plate 262 for guiding the recording medium to the storage casing 261. The recording medium identified as having no mode-identification mark is conveyed to the pair of output rollers 263 while guided by the movable guide plate 267 and is ejected to the storage casing 261 by action of the pair of output rollers 263.

The image forming-erasing system according to this embodiment is configured as follows. The recording medium is housed in the recording medium storage casing so as to convey the recording medium in the widthwise direction both in the image forming apparatus and the image erasing device. The image forming apparatus prohibits conveying of the recording medium in a lengthwise direction upon image formation according to the first image-forming mode. Specifically, image formation according to the first image-forming mode is prohibited when the side fence of the recording medium storage casing 232*b* in the image forming apparatus is set at such a position as to feed the recording medium in the lengthwise direction. Likewise, the image erasing device is so configured as to house only recording medium storage casings that can house the recording medium in the transverse feed direction.

<Image Erasing Device Based on Dry-Rubbing Method>

Figure 5:
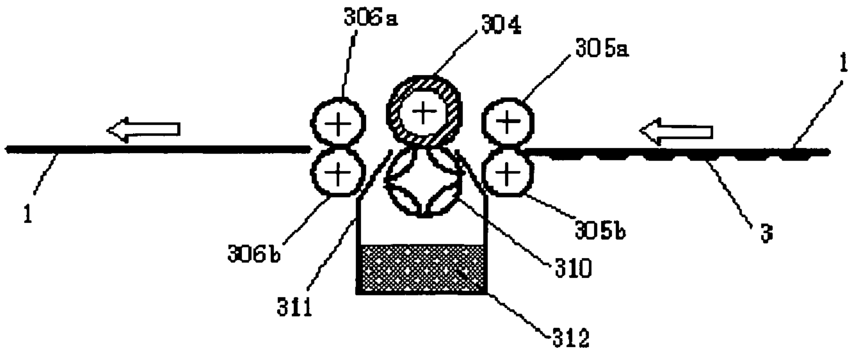
FIG. 5 is an exemplary device for regenerating a recording medium that performs erasion of image forming materials by rubbing.
Figure 6A:
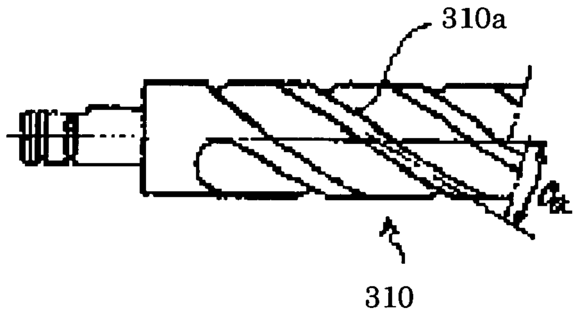
FIG. 6A is a schematic view that exemplarily shows a roller of a device for regenerating a recording medium to which spiral blades are formed.
Figure 6B:
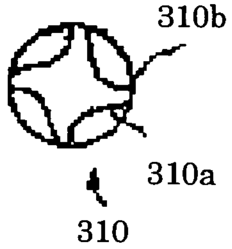
FIG. 6B is a schematic cross section of the roller shown in FIG. 6A.

FIG. 5 shows an exemplary device for regenerating recording media that erase image forming materials by way of rubbing. In FIG. 5, image forming material 3 on recording media 1 is erased by rotating spiral blade 310. The spiral blade 310 is a roller into which plural spiral blades are formed, e.g. four spiral lines in FIGS. 6A and 6B. The spiral blade may be formed from steels or ceramics that are employed for blades of drilling machines or milling machines. A pressure is applied between spiral blade 310 and backup roller 304, on which an elastomer material is provided, by a pressure means (not shown), and the spiral blade contact with the recording medium along a certain distance by action of rotating spiral blade 310. The spiral blade 310 can remove the image forming material in both of the forward and reverse directions to the conveying direction of the recording medium. The image forming material 312 removed from the recording medium is collected into the collecting container 311 for the image forming materials. When the spiral blade 310 is rotated in the forward direction, the speed of the contact surface of the roller with the recording medium is made faster than the conveying speed of the recording medium.

A blade with a straight shape may remove image forming materials formed on recording media with higher surface smoothness in place of the spiral blade. However, the blade with a straight shape typically lead to remarkably higher friction force between the blade and recording media, thus the transport of the recording media is likely to be difficult. On the contrary, the contacting area between the recording media and the blade is relatively small in spiral blades, thus enabling the transport of recording media with less friction resistance.

In FIG. 5, reference numbers 305*a* and 305*b*, 306*a* and 306*b* are roller pairs for conveying recording media 1. Preferably, the recording media are somewhat tensioned in order to appropriately remove the image forming materials on conventional paper. For this purpose, the linear velocity of roller pair of 306*a* and 306*b* is designed higher than that of roller pair 305*a* and 305*b* so as to remove easily the image forming materials.

The present invention will be explained in more detail with reference to examples given below, but these are not to be construed as limiting the present invention. All parts are by weight unless indicated otherwise.

SYNTHESIS EXAMPLE 1

—Synthesis of Olefin-Maleic Anhydride Copolymer—

A mixture of liner a-olefin compounds having a carbon number of 12 to 14 and maleic anhydride were poured into an autoclave in a mole ratio of 1/1, and the atmosphere within the autoclave was replaced with nitrogen gas, then the mixed compounds were allowed to react at 200° C. for 5 hours. The mixture of liner α-olefin compounds was comprised of an olefin compound having a carbon number of 12, an olefin compound having a carbon number of 13, and an olefin compound having a carbon number of 14 in a mole ratio of 4/3/3.

The resultant reaction product was saponified in an ammonium hydroxide aqueous solution, thereby an aqueous solution of a polymer was obtained. The solid content of the polymer was 20% by mass in the aqueous solution.

SYNTHESIS EXAMPLE 2

—Synthesis of Olefin-Maleic Anhydride Copolymer—

A mixture of liner a-olefin compounds having a carbon number of 16 to 18 and maleic anhydride were poured into an autoclave in a mole ratio of 1/1, and the atmosphere within the autoclave was replaced with nitrogen gas, then the mixed compounds were allowed to react at 200° C. for 5 hours. The mixture of liner α-olefin compounds was comprised of an olefin compound having a carbon number of 16, an olefin compound having a carbon number of 17, and an olefin compound having a carbon number of 18 in a mole ratio of 5/3/2.

The resultant reaction product was saponified in an ammonium hydroxide aqueous solution, thereby an aqueous solution of a polymer was obtained. The solid content of the polymer was 20% by mass in the aqueous solution.

SYNTHESIS EXAMPLE 3

—Synthesis of Olefin-Maleic Anhydride Copolymer—

A mixture of liner α-olefin compounds having a carbon number of 14 to 16 and maleic anhydride were poured into an autoclave in a mole ratio of 1/1, and the atmosphere within the autoclave was replaced with nitrogen gas, then the mixed compounds were allowed to react at 200° C. for 5 hours. The mixture of liner α-olefin compounds was comprised of an olefin compound having a carbon number of 14, an olefin compound having a carbon number of 15, and an olefin compound having a carbon number of 16 in a mole ratio of 3/5/2.

The resultant reaction product was saponified in an ammonium hydroxide aqueous solution, thereby an aqueous solution of a polymer was obtained. The solid content of the polymer was 20% by mass in the aqueous solution.

SYNTHESIS EXAMPLE 4

—Synthesis of Olefin-Maleic Anhydride Copolymer—

A mixture of α-olefin compounds having branched alkyl groups of which the carbon number was 12 to 14 and maleic anhydride were poured into an autoclave in a mole ratio of 1/1, and the atmosphere within the autoclave was replaced with nitrogen gas, then the mixed compounds were allowed to react at 200° C. for 5 hours. The mixture of branched α-olefin compounds was comprised of an olefin compound having a carbon number of 12, an olefin compound having a carbon number of 13, and an olefin compound having a carbon number of 14 in a mole ratio of 2/4/4.

The resultant reaction product was saponified in an ammonium hydroxide aqueous solution, thereby an aqueous solution of a polymer was obtained. The solid content of the polymer was 20% by mass in the aqueous solution.

SYNTHESIS EXAMPLE 5

—Synthesis of Olefin-Maleic Anhydride Copolymer—

A mixture of branched α-olefin compounds having branched alkyl groups of which the carbon number was 18 to 20 and maleic anhydride were poured into an autoclave in a mole ratio of 1/1, and the atmosphere within the autoclave was replaced with nitrogen gas, then the mixed compounds were allowed to react at 200° C. for 5 hours. The mixture of branched α-olefin compounds was comprised of an olefin compound having a carbon number of 18, an olefin compound having a carbon number of 19, and an olefin compound having a carbon number of 20 in a mole ratio of 5/3/2.

The resultant reaction product was saponified in an ammonium hydroxide aqueous solution, thereby an aqueous solution of a polymer was obtained. The solid content of the polymer was 20% by mass in the aqueous solution.

COMPARATIVE SYNTHESIS EXAMPLE 1

—Synthesis of Olefin-Maleic Anhydride Copolymer—

A mixture of branched α-olefin compounds having branched alkyl groups of which the carbon number was 8 and 9 and maleic anhydride were poured into an autoclave in a mole ratio of 1/1, and the atmosphere within the autoclave was replaced with nitrogen gas, then the mixed compounds were allowed to react at 200° C. for 5 hours. The mixture of branched α-olefin compounds was comprised of an olefin compound having a carbon number of 8 and an olefin compound having a carbon number of 9 in a mole ratio of 6/4.

The resultant reaction product was saponified in an ammonium hydroxide aqueous solution, thereby an aqueous solution of a polymer was obtained. The solid content of the polymer was 20% by mass in the aqueous solution.

EXAMPLE 1

—Preparation of Reusable Electrophotographic Recording Medium—

The coating liquid of the formula described below was coated on both sides of commercially available wood free paper (Ricoh PPC Type 6200, by Ricoh Co.) in an amount of 4.8 $g/m^2$ per one side after drying by use of a wire bar, and was dried at 120° C. for 5 minutes. The wood free paper, both sides of which were coated with the coating liquid, was subjected to super calendaring, and was cut into sheets having a size printable by a practical machine, then each of the sheets was notched at the edge to provide a mark for identifying a reusable recording medium, thereby an electrophotographic recording medium was prepared. The content of the olefin-maleic anhydride copolymer was 73% by mass based on the solid content of the coated composition.

| | |
|---|---|
| Aqueous solution of the olefin-maleic anhydride copolymer obtained in Synthesis Example 1 | 30 parts |
| Aqueous solution of 15% by mass oxidized starch | 15 parts |

EXAMPLE 2

An electrophotographic recording medium was prepared in the same manner as Example 1, except that the coating liquid of the formula described below was employed. The content of the olefin-maleic anhydride copolymer was 25% by mass based on the solid content of the coated composition.

| | |
|---|---|
| Aqueous solution of the olefin-maleic anhydride copolymer obtained in Synthesis Example 2 | 10 parts |
| Aqueous solution of 15% by mass oxidized starch | 40 parts |

EXAMPLE 3

An electrophotographic recording medium was prepared in the same manner as Example 1, except that the coating liquid of the formula described below was employed. The content of the olefin-maleic anhydride copolymer was 53% by mass based on the solid content of the coated composition.

| | |
|---|---|
| Aqueous solution of the olefin-maleic anhydride copolymer obtained in Synthesis Example 3 | 25 parts |
| Aqueous solution of 15% by mass oxidized starch | 30 parts |

EXAMPLE 4

An electrophotographic recording medium was prepared in the same manner as Example 1, except that the coating liquid was changed into the aqueous solution of the olefin-maleic anhydride copolymer itself obtained in Synthesis Example 4. The content of the olefin-maleic anhydride copolymer was 100% by mass based on the solid content of the coated composition.

EXAMPLE 5

An electrophotographic recording medium was prepared in the same manner as Example 1, except that the coating liquid of the formula described below was employed. The content of the olefin-maleic anhydride copolymer was 25% by mass based on the solid content of the coated composition.

| | |
|---|---|
| Aqueous solution of the olefin and maleic anhydride copolymer obtained in Synthesis Example 5 | 10 parts |
| Aqueous solution of 15% by mass oxidized starch | 40 parts |

REFERENCE EXAMPLE 1

An electrophotographic recording medium was prepared in the same manner as Example 4, except that the coating liquid was changed from the aqueous solution of the olefin-maleic anhydride copolymer obtained in Synthesis Example 4 into the aqueous solution of the olefin-maleic anhydride copolymer obtained in Comparative Synthesis Example 1. The content of the olefin-maleic anhydride copolymer was 100% by mass based on the solid content of the coated composition.

COMPARATIVE EXAMPLE 2

The commercially available wood free paper (Ricoh PPC Type 6200, by Ricoh Co.) was notched at the edge to provide a mark for identifying a reusable recording medium without coating any olefin-maleic anhydride copolymer, thereby an electrophotographic recording medium was prepared for a comparative example.

COMPARATIVE EXAMPLE 3

An electrophotographic recording medium was prepared for a comparative example in the same manner as Example 1, except that the aqueous solution of 10% by mass oxidized starch was employed for the coating liquid. The content of the olefin-maleic anhydride copolymer was 0% by mass based on the solid content of the coated composition.

EXAMPLE 6

The coating liquid of the formula described below was dispersed by Atritor, and the resultant dispersion of white pigment was coated on both sides of commercially available wood free paper (Ricoh PPC Type 6200, by Ricoh Co.) in an amount of 2.9 g/m$^2$ per one side after drying, and was dried at 120° C. for 3 minutes, thereby a filling layer was provided.

| | |
|---|---|
| Aqueous solution of 10% by mass polyvinyl alcohol | 10 parts |
| White pigment of calcium carbonate | 1 part |

Then the wood free paper having the filling layer was subjected to super calendaring, and the coating liquid of the formula described below was coated on the filling layer by use of a wire bar in an amount of 1.2 g/m$^2$ per one side after drying, and was dried at 120° C. for 5 minutes.

The wood free paper, both sides of which were coated with the coating liquid, was subjected to super calendaring, and was cut into sheets, then each of the sheets was notched at the edge to provide a mark for identifying a reusable recording medium, thereby an electrophotographic recording medium was prepared. The content of the olefin-maleic anhydride copolymer was 73% by mass based on the solid content of the coated composition.

| | |
|---|---|
| Aqueous solution of the olefin and maleic anhydride copolymer obtained in Synthesis Example 1 | 30 parts |
| Aqueous solution of 15% by mass oxidized starch | 15 parts |

EXAMPLE 7

Using the paper provided with the filling layer of Example 6, an electrophotographic recording medium was prepared in the same manner as Example 6, except that the coating liquid of the formula described below was employed. The content of the olefin-maleic anhydride copolymer was 25% by mass based on the solid content of the coated composition.

| | |
|---|---|
| Aqueous solution of the olefin and maleic anhydride copolymer obtained in Synthesis Example 2 | 10 parts |
| Aqueous solution of 15% by mass oxidized starch | 40 parts |

EXAMPLE 8

Using the paper provided with the filling layer of Example 6, an electrophotographic recording medium was prepared in the same manner as Example 6, except that the coating liquid of the formula described below was employed. The content of the olefin-maleic anhydride copolymer was 53% by mass based on the solid content of the coated composition.

| | |
|---|---|
| Aqueous solution of the olefin and maleic anhydride copolymer obtained in Synthesis Example 3 | 25 parts |
| Aqueous solution of 15% by mass oxidized starch | 30 parts |

EXAMPLE 9

Using the paper provided with the filling layer of Example 6, an electrophotographic recording medium was prepared in the same manner as Example 6, except that the coating liquid was changed into the aqueous solution of the olefin-maleic anhydride copolymer itself obtained in Synthesis Example 4. The content of the olefin-maleic anhydride copolymer was 100% by mass based on the solid content of the coated composition.

EXAMPLE 10

Using the paper provided with the filling layer of Example 6, an electrophotographic recording medium was prepared in the same manner as Example 6, except that the coating liquid of the formula described below was employed. The content of the olefin-maleic anhydride copolymer was 25% by mass based on the solid content of the coated composition.

| | |
|---|---|
| Aqueous solution of the olefin and maleic anhydride copolymer obtained in Synthesis Example 5 | 10 parts |
| Aqueous solution of 15% by mass oxidized starch | 40 parts |

COMPARATIVE EXAMPLE 4

The paper provided with the filling layer of Example 6 was cut into sheets having a size printable by a practical machine, then each of the sheets was notched at the edge to provide a mark for identifying a reusable recording medium, thereby an electrophotographic recording medium was prepared for a comparative example.

COMPARATIVE EXAMPLE 5

Using the paper provided with the filling layer of Example 6, an electrophotographic recording medium for a comparative example was prepared in the same manner as Example 6, except that the olefin-maleic anhydride copolymer was changed into a silicone resin (KR251, by Shin-Etsu Chemical Co.), and the silicone resin was coated using toluene as a solvent and subjected the other treatments in the same manner as Example 6.

REFERENCE EXAMPLE 6

Using the paper provided with only the filling layer of Example 6, an electrophotographic recording medium for a comparative example was prepared in the same manner as Example 6, except that the olefin-maleic anhydride copolymer was changed into a fluorine-containing methacrylate resin (Texguard, by Daikin Industries, Ltd.) and the fluorine-containing methacrylate resin was coated in an amount of 0.6 $g/m^2$ using CFC-113 as a solvent, and subjected the other treatments in the same manner as Example 6.

COMPARATIVE EXAMPLE 7

Using the paper provided with the filling layer of Example 6, an electrophotographic recording medium was prepared in the same manner as Example 6 for a comparative example, except that the coating liquid of the olefin-maleic anhydride copolymer was changed into the coating liquid of the formula described below.

| | |
|---|---|
| Aqueous solution of the olefin and maleic anhydride copolymer obtained in Synthesis Example 1 | 30 parts |
| Aqueous solution of 15% by mass polyvinyl alcohol having a saponification rate of 98% | 15 parts |

EXAMPLE 11

Using the paper provided with the filling layer of Example 6, an electrophotographic recording medium was prepared in the same manner as Example 6, except that the coating liquid of the formula described below was employed. The content of the olefin-maleic anhydride copolymer was 63% by mass based on the solid content of the coated composition.

| | |
|---|---|
| Aqueous solution of the olefin and maleic anhydride copolymer obtained in Synthesis Example 1 | 30 parts |
| Aqueous solution of 15% by mass oxidized starch | 15 parts |
| Styrene-acrylic dispersant of organic pigment (solid content: 30% by mass, MH5055, by Zeon Corporation) | 4 parts |

(solid content: 30% by mass, MH5055, by Zeon Corporation)

EXAMPLE 12

Using the paper provided with the filling layer of Example 6, an electrophotographic recording medium was prepared in the same manner as Example 6, except that the coating liquid of the formula described below was employed. The content of the olefin-maleic anhydride copolymer was 71% by mass based on the solid content of the coated composition.

| | |
|---|---|
| Aqueous solution of the olefin and maleic anhydride copolymer obtained in Synthesis Example 1 | 30 parts |
| 30% by mass aqueous solution of water-soluble acrylic resin (T-YP-147, by Seiko PMC Co.) | 8 parts |

EXAMPLE 13

Using the paper provided with the filling layer of Example 6, an electrophotographic recording medium was prepared in the same manner as Example 6, except that the coating liquid of the formula described below was employed. The content of the olefin-maleic anhydride copolymer was 21% by mass based on the solid content of the coated composition.

| | |
|---|---|
| Aqueous solution of the olefin and maleic anhydride copolymer obtained in Synthesis Example 2 | 10 parts |
| 25% by mass aqueous solution of water-soluble acrylic resin (T-YP-146, by Seiko PMC Co.) | 30 parts |

EXAMPLE 14

Using the paper provided with the filling layer of Example 6, an electrophotographic recording medium was prepared in the same manner as Example 6, except that the coating liquid of the formula described below was employed. The content of the olefin-maleic anhydride copolymer was 50% by mass based on the solid content of the coated composition.

| | |
|---|---|
| Aqueous solution of the olefin and maleic anhydride copolymer obtained in Synthesis Example 3 | 30 parts |
| 30% by mass aqueous solution of water-soluble acrylic resin (T-YP-147, by Seiko PMC Co.) | 20 parts |

<Method for Forming Image and Method for Erasing Image>

Color images were formed by using the image forming-erasing system shown in FIG. 4 that was integrally equipped with the image forming apparatus and the image erasing apparatus, housing electrophotographic recording media with cut corners of Examples 1 to 14 and Comparative or Reference Examples 1 to 7 into a paper-feed cassette of the image forming apparatus which was comprised of the unit for detecting a cut or notch, and filling a commercially available developer (based on a polyester resin, for IPSiO CX8200, by Ricoh Co.) into the developing device. The Specific conditions were as follows.

| | |
|---|---|
| Process linear velocity | 130 mm/sec |
| Temperature of fixing roller | 170° C. |
| Surface Pressure at fixing roller | 15 $N/cm^2$ |

<Fixing Property>

The fixing property of resultant images was evaluated as follows. A black gradation image having an area ratio of 30% was rubbed 10 both ways by a cotton cloth attached to Crock Meter, then the concentration of the image forming material separated from a recording medium and attached to the cotton cloth was measured by use of Macbeth Densitometer. The concentration on the cotton cloth was deducted by the concentration of the cotton cloth itself, and the fixing property was evaluated as follows.

[Evaluation Criteria]

A: concentration of separated image was less than 0.20

B: concentration of separated image was 0.20 to 0.39

C: concentration of separated image was 0.40 or more

<Repeatability>

In the evaluation of repeatability of recording media, images on recording media were erased, and the image same with the first image was printed repeatedly at the first printed site as correct as possible. Although the respective recording media were applied a toner-repellent agent on both sides, the image was formed on only one side and then the image was erased in the evaluation of the repeatability. The images on the recording media were erased using the image forming-erasing system shown in FIG. 4 that was integrally equipped with the image forming apparatus and the image erasing apparatus.

The conditions in erasing images were as follows.

Process linear velocity: 25 mm/sec

Temperature at transferring and fixing: 115° C.

Peeling member: polyimide film of 100 μm thick

Surface pressure at fixing roller: 20 N/$cm^2$

Separation between paper and peeling member: separation by curvature radius of 2 mm <Image Erasing Property>

The image erasing property was evaluated under the criteria described below by printing and erasing solid images of yellow, magenta, cyan, black, and secondary colors, then measuring image density by Macbeth Densitometer.

Each of the remaining image concentrations was determined by deducting the virgin image concentration from the image concentration of the recording media after the solid image was erased. The measurements were carried out with respect to yellow, magenta, cyan, black, and secondary colors, and the evaluations were conducted in terms of the highest value of the remaining image concentration.

A: remaining image concentration was 0.02 or less

B: remaining image concentration was 0.03 to 0.09

C: remaining image concentration was 0.10 to 0.29

D: remaining image concentration was 0.30 or more

The results of the evaluation were shown in Table 1 in terms of the repeatability as to fixing and erasing of recording media of Examples 1 to 14 and Comparative or Reference Examples 1 to 7.

TABLE 1

| | Image Fixing Property | | | Image Erasing Property | | |
|---|---|---|---|---|---|---|
| | 1 st | 15 th | 30 th | 1 st | 15 th | 30 th |
| Ex. 1 | A | A | A | A | B | C |
| Ex. 2 | A | A | A | A | A | B |
| Ex. 3 | A | A | A | A | A | B |
| Ex. 4 | A | A | A | A | B | C |
| Ex. 5 | A | A | A | A | A | B |
| Ex. 6 | A | A | A | A | A | A |
| Ex. 7 | A | A | A | A | A | A |
| Ex. 8 | A | A | A | A | A | A |
| Ex. 9 | A | A | A | A | A | A |
| Ex. 10 | A | A | A | A | A | A |
| Ex. 11 | A | A | A | A | A | A |
| Ex. 12 | A | A | A | A | A | A |
| Ex. 13 | A | A | A | A | A | A |
| Ex. 14 | A | A | A | A | A | A |
| Refer. Ex. 1 | A | — | — | D | — | — |
| Comp. Ex. 2 | A | — | — | D | — | — |
| Comp. Ex. 3 | A | — | — | D | — | — |
| Comp. Ex. 4 | A | — | — | D | — | — |
| Comp. Ex. 5 | C | C | — | A | A | — |
| Refer. Ex. 6 | C | C | — | A | A | — |
| Comp. Ex. 7 | A | — | — | C | — | — |

TABLE 1-continued

The repeatability was evaluated for the recording media through erasing images by way of another dry rubbing-erasing method shown in FIG. 5; images were formed in the same way described above. The results are shown in Table 2.

TABLE 2

| | Image Fixing Property | | | Image Erasing Property | | |
|---|---|---|---|---|---|---|
| | 1 st | 15 th | 30 th | 1 st | 15 th | 30 th |
| Ex. 1 | A | A | A | B | C | — |
| Ex. 2 | A | A | A | A | B | C |
| Ex. 3 | A | A | A | A | B | C |
| Ex. 4 | A | A | A | A | C | — |
| Ex. 5 | A | A | A | A | B | C |
| Ex. 6 | A | A | A | A | B | C |
| Ex. 7 | A | A | A | A | A | B |
| Ex. 8 | A | A | A | A | A | B |
| Ex. 9 | A | A | A | A | B | C |
| Ex. 10 | A | A | A | A | A | B |
| Ex. 11 | A | A | A | A | A | B |
| Ex. 12 | A | A | A | A | B | C |
| Ex. 13 | A | A | A | A | B | C |
| Ex. 14 | A | A | A | A | A | B |
| Refer. Ex. 1 | A | — | — | D | — | — |
| Comp. Ex. 2 | A | — | — | D | — | — |
| Comp. Ex. 3 | A | — | — | D | — | — |
| Comp. Ex. 4 | A | — | — | D | — | — |
| Comp. Ex. 5 | C | C | — | A | A | — |
| Refer. Ex. 6 | C | C | — | A | A | — |
| Comp. Ex. 7 | A | — | — | C | — | — |

A powdery image forming material based on styrene-acrylic resin was prepared by a polymerization process described below, and the resultant powdery image forming material was filled within the apparatus shown in FIG. 4, then images were formed and the fixing property and erasing property of images were evaluated.

<Production Example of Image Forming Material Based on Styrene-Acrylic Resin>

Initially, 8 parts of carnauba wax, 90 parts of styrene, 35 parts of n-butylacrylate, and 10 parts of methacrylic acid were mixed at 85° C. to yield a liquid of the monomers. Separately, 5.5 parts of sodium dodecylbenzene sulfonate was dissolved into 2,200 parts of deionized water to yield a surfactant solution.

Then, the liquid of the monomers was mixed and dispersed into the surfactant solution. To the resultant dispersion, a solution of 0.72 part of potassium persulfate of a radical polymerization initiator and 170 parts of deionized water was added in nitrogen atmosphere, and the resultant mixture was heated at 80° C. for 3 hours under stirring. To the mixture, a solution of 6.1 parts of potassium persulfate and 200 parts of deionized water was added, then a mixture liquid of 300 parts of styrene, 120 parts of n-butylacrylate, and 35 parts of methacrylic acid was dropped at 80° C. for a period of 120 minutes. After the dropping of the mixture liquid was completed, the mixture was subjected to heating and stirring for 60 minutes to produce a latex.

Separately, 28 parts of sodium n-dodecyl sulfate was dissolved into 850 parts of deionized water. While stirring the solution, 100 parts of carbon black of a black pigment was added to the solution little by little to prepare a dispersion.

Next, 550 parts of the resultant latex, 140 parts of the dispersion containing a carbon black, and 250 parts of deionized water were mixed and stirred, to which 3N aqueous solution of sodium hydroxide was added to adjust the pH into 10.0. To the resultant dispersion, an aqueous solution of 13 parts of magnesium chloride hexahydrate and 20 parts of deionized water was added. Then, the resultant mixture was heated to 90° C., and an aqueous solution of sodium chloride was added to the mixture, thereby the particle growth was stopped resulting in nearly spherical particles having an average particle diameter of 5.6 μm. The salting out was continued for a while, the resultant product was filtered, the filter cake was rinsed with an aqueous solution of ethanol, then was dried by warm gas stream, thereby black matrix particles were prepared.

Similarly to typical production methods of toner, 0.5 part of silica gel was added to 100 parts of the matrix particles, the mixture was blended by Henschel mixer, then particles with larger sizes were destroyed by passing through a mesh, thereby a powder of image forming material was obtained with a volume average particle diameter of 5.6 μm.

Plural powders of image forming materials were prepared in the same manner as the black image forming material, except that the carbon black was exchanged into C.I. pigment yellow 94, C.I. pigment red 122, and C.I. pigment blue 15:2, thereby yellow, cyan, and magenta image forming materials were produced each having approximately the same size and shape with those of the black image forming material.

Each of the image forming materials produced by the polymerization method was filled into the apparatus shown in FIG. 5, images were formed as described above, and the images were erased by the image erasing apparatus shown in FIG. 5. The results of forming and erasing of images are summarized in Table 3.

TABLE 3

| | Image Fixing Property | | | Image Erasing Property | | |
|---|---|---|---|---|---|---|
| | 1 st | 15 th | 30 th | 1 st | 15 th | 30 th |
| Ex. 1 | A | B | B | A | A | B |
| Ex. 2 | A | A | B | A | A | A |
| Ex. 3 | A | A | A | A | A | A |
| Ex. 4 | A | B | C | A | A | B |
| Ex. 5 | A | A | A | A | A | B |
| Ex. 6 | A | A | B | A | A | A |
| Ex. 7 | A | A | A | A | A | A |
| Ex. 8 | A | A | A | A | A | A |
| Ex. 9 | A | B | C | A | A | A |
| Ex. 10 | A | A | A | A | A | A |
| Ex. 11 | A | A | A | A | A | A |
| Ex. 12 | A | A | A | A | A | A |
| Ex. 13 | A | A | A | A | A | B |
| Ex. 14 | A | A | A | A | A | A |
| Refer. Ex. 1 | A | — | — | D | — | — |
| Comp. Ex. 2 | A | — | — | D | — | — |
| Comp. Ex. 3 | A | — | — | D | — | — |
| Comp. Ex. 4 | A | — | — | D | — | — |
| Comp. Ex. 5 | C | C | — | A | A | — |
| Refer. Ex. 6 | C | C | — | A | A | — |
| Comp. Ex. 7 | A | — | — | D | — | — |

The electrophotographic recording media of the present invention may be applied to electrophotographic methods in which electrostatic latent images are formed on a photoconductor, the latent images are developed using a toner, and toner images are transferred onto a recording medium, and also may be applied to electrophotographic methods and apparatuses with no use of photoconductors such as electrostatic recording methods, toner jet recording methods, ion flow recording methods.

In addition, from the reasons that the electrophotographic recording media of the present invention are superior in image fixing property as well as image erasing property, it will be apparent that the recording media may be applied to erase various images formed by various methods in addition to electrophotographic methods. When the recording media of the present invention are applied to image forming methods in which images are formed by use of image forming materials in particular thermoplastic image forming materials, it will be possible to erase appropriately images with superior fixing property, and to provide repeatable usages of the recording media.

Accordingly, the electrophotographic recording media of the present invention can be applied to form images by use of electrophotographic apparatuses, and further to form images, to remove image forming materials from recording media on which images are recorded, and to reuse the recording media successfully under magnetic recording processes and thermal transfer processes by use of powdery image forming materials and inkjet processes by use of hot-melt solid inks.

What is claimed is:

1. A method for repeatedly using an electrophotographic recording medium, comprising:

depositing a thermoplastic image forming material on the electrophotographic recording medium in accordance with an image pattern to form an image, overlapping and pressing the surface of the electrophotographic recording medium, on which the image is formed and is turned into softened condition, with a peeling member in a stage that the image is unnecessary, separating the peeling member from the electrophotographic recording medium, removing the image forming material on the electrophotographic recording medium by way of transferring the image forming material onto the peeling member, thereby regenerating the electrophotographic recording medium, and forming an image again on the electrophotographic recording medium, wherein the peeling member is able to adhere more strongly with the image forming material than the electrophotographic recording medium, the electrophotographic recording medium comprises a support and an olefin-maleic anhydride copolymer on the support, the olefin-maleic anhydride copolymer exists at least near the surface of the electrophotographic recording medium on which an image is recorded;

wherein the olefin portion of the olefin-maleic anhydride copolymer is obtained from an olefin monomer having a carbon number of from 10 to 20, the support is coated with a composition comprising water and the olefin-maleic anhydride copolymer, which has been hydrolyzed with an ammonium hydroxide, by dissolving in an aqueous medium, and the electrophotographic recording medium is dried to separate ammonia from the coated composition, and is reusable.

2. The method for repeatedly using an electrophotographic recording medium according to claim 1, wherein the olefin portion of the olefin-maleic anhydride copolymer is derived from an α-olefin monomer having a double bond at the α-site.

3. The method for repeatedly using an electrophotographic recording medium according to claim 1, wherein the olefin-maleic anhydride copolymer comprises at least a monomer unit of olefin and at least a monomer unit of maleic anhydride in a mole ratio of 1.3/1 to 1/1.3.

4. The method for repeatedly using an electrophotographic recording medium according to claim 1, wherein the electrophotographic recording medium further comprises one of starches, starch derivatives, and acrylic resins at least near the surface of the electrophotographic recording medium, on which the image is recorded, in a content of 20% by mass to 80% by mass.

5. The method for repeatedly using an electrophotographic recording medium according to claim 1, wherein the electrophotographic recording medium further comprises an organic pigment at least near the surface of the electrophotographic recording medium on which the image is recorded.

6. The method for repeatedly using an electrophotographic recording medium according to claim 1, wherein the thermoplastic image forming material contains at least one of thermoplastic polyester resins and styrene-acrylic resins.

* * * * *